United States Patent [19]

Kimmel

[11] Patent Number: 4,850,027
[45] Date of Patent: Jul. 18, 1989

[54] CONFIGURABLE PARALLEL PIPELINE IMAGE PROCESSING SYSTEM

[75] Inventor: Milton J. Kimmel, Somers, N.Y.

[73] Assignee: International Business Machines Corporation, Armonk, N.Y.

[21] Appl. No.: 150,000

[22] Filed: Feb. 5, 1988

Related U.S. Application Data

[63] Continuation of Ser. No. 759,640, Jul. 26, 1985, abandoned.

[51] Int. Cl.$^4$ .............................................. G06K 9/54
[52] U.S. Cl. ..................................... 382/49; 364/133; 364/900; 382/41
[58] Field of Search ................... 382/41, 49; 364/900, 364/736, 715, 133, 140

[56] References Cited

U.S. PATENT DOCUMENTS

| | | | |
|---|---|---|---|
| 3,226,569 | 12/1965 | James | 307/88.5 |
| 3,356,837 | 12/1967 | Raymond | 235/153 |
| 3,419,849 | 12/1968 | Anderson et al. | 340/172.5 |
| 3,553,654 | 1/1971 | Crane | 340/172.5 |
| 3,603,934 | 9/1971 | Heath, Jr. | 340/172.5 |
| 3,660,646 | 5/1972 | Minero et al. | 235/153 |
| 3,665,418 | 5/1972 | Bouricius et al. | 340/172.5 |
| 3,681,579 | 8/1972 | Stevens | 235/153 |
| 3,805,035 | 4/1974 | Serra | 235/151.3 |
| 3,970,993 | 7/1976 | Finnila | 340/172.5 |
| 4,174,514 | 11/1979 | Sternberg | 340/146.3 |
| 4,395,698 | 7/1983 | Sternberg et al. | 382/27 |
| 4,395,699 | 7/1983 | Sternberg | 382/41 |
| 4,395,700 | 7/1983 | McCubbrey et al. | 382/27 |
| 4,398,248 | 8/1983 | Hsia et al. | 364/200 |
| 4,441,207 | 4/1984 | Lougheed et al. | 382/8 |
| 4,464,788 | 8/1984 | Sternberg et al. | 382/41 |
| 4,467,409 | 8/1984 | Potash et al. | 364/200 |
| 4,484,346 | 11/1984 | Sternberg et al. | 382/27 |
| 4,484,349 | 11/1984 | McCubbrey | 382/49 |
| 4,490,848 | 12/1984 | Beall et al. | 382/121 |
| 4,524,455 | 6/1985 | Holsztynski et al. | 382/41 |
| 4,598,400 | 6/1986 | Hillis | 370/60 |
| 4,601,055 | 7/1986 | Kent | 382/49 |
| 4,665,556 | 5/1987 | Fukushima et al. | 382/49 |

FOREIGN PATENT DOCUMENTS

54-30383  3/1979  Japan ................................. 371/11
0543941  1/1977  U.S.S.R. ............................. 371/11

OTHER PUBLICATIONS

E. J. Lerner, "Parallel Processing Gets Down to Business", High Technology, Jul. 1985, pp. 9–17.

(List continued on next page.)

*Primary Examiner*—Leo H. Bourdreau
*Assistant Examiner*—Joseph Mancuso
*Attorney, Agent, or Firm*—Philip J. Feig

[57] ABSTRACT

Configurable processing element groups (PEGs), made up of processing elements (PEs) and boolean combiner image switches (BC), arrayed in image processing subassemblies (CAGEs) having limited external PE connections, provide myriad image processing network choices without massive investment in memory and bus capacity. PEs have full variable connectability within the PEG, and connectability via limited bus connections to PEs in related PEGs. Image switching is implemented by the BC, which is feedback connected to PEs within the PEG. Each PEG is also directly connected to the next PEG, through its BC, in straighforward pipeline configuration. For simple jobs, the implementor configures simple networks of PEs within PEGs. For demanding jobs, the implementor configures PEs in one PEG together with PEs from other PEGs, in a compound bus-connected network within the CAGE. For very demanding jobs, the implementor uses the PEs in the system not only as binary window processors, but also as additional switching paths, logic inverters and delay elements, setting up the image processing system most closely approaching the optimum for the job. Limitations are only bus capacity, bus connections and CAGE to CAGE connections. The system features host computer, video buffer, and pipeline of CAGEs, each CAGE having bit stream input, an array of PEGs, and CAGE exit mechanism which provides a bit stream output in the form of X-Y coordinates of selected pels. An additional feedback loop, from BC output to BC input within the PE, significantly adds to capability with little additional structure.

13 Claims, 19 Drawing Sheets

OTHER PUBLICATIONS

J. R. Mandeville, "Novel Method for Analysis of Printed Circuit Images", IBM Journal Res. Development, vol. 29, No. 1, Jan. 1985, pp. 73-86.

R. M. Lougheed, D. L. McCubbrey, "The Cytocomputer: A Practical Pipelined Image Processor", Proc. 7th Annual Intls. Symp. on Computer Architecture, May 1980.

D. J. Svetkoff, J. B. Candlish, P. W. VanAtta, "High Resolution Imaging for Visual Inspection of Multi-Layer Thick-Film Circuits", RI/SME Conference on Applied Machine Vision, Memphis, Tennessee, Feb. 1983.

U. Montanari, "Continuous Skeletons from Digitized Images", Journal of the Association for Computing Machinery, vol. 16, No. 4, Oct. 1969, pp. 534-539.

R. Stefanelli, A. Rosenfeld, "Some Parallel Thinning Algorithms for Digital Pictures", Journal of the Association for Computing Machinery, vol. 18, No. 2, Apr. 1971, pp. 255-264.

S. R. Sternberg, "Biomedical Image Processing", IEEE Computer, Jan. 1983, pp. 22-28.

S. R. Sternberg, "Language and Architecture for Parallel Image Processing", Pattern Recognition in Practice, E. S. Gelsema and L. N. Kanal, eds., North Holland Publishing Co., 1980.

K-S. Fu, "Pattern Recognition for Automatic Visual Inspection", IEEE Computer, Dec. 1982, pp. 34-40.

R. M. Lougheed, D. L. McCubbrey, S. R. Sternberg, "Cytocomputers: Architectures for Parallel Image Processing", Proc. IEEE Workshop on Picture Data Description and Management, Aug. 1980, pp. 281-286.

M. A. Hegyi, R. W. Kelley, D. L. McCubbrey, C. B. Morningstar, "Computer Algorithms for Visually Inspecting Thick Film Circuits", Environmental Research Institute of Michigan.

Hopkins, Jr. et al, "FTMP-A Highly Reliable Fault-Tolerant Multiprocessor for Aircraft", Proceedings of the IEEE, vol. 66, No. 10, Oct. 1978, pp. 1221-1239.

J. Losq, "A Highly Efficient Redundancy Scheme: Self-Purging Redundancy," IEEE Transactions on Computers, vol. C-25, No. 6, Jun. 1976, pp. 569-578.

C. V. Ramamoorthy et al, "Reliability Analysis of Systems with Concurrent Error Detection," IEEE Transactions on Computers, vol. C-24, No. 9, Sep. 1975, pp. 868-878.

A. Bautista et al, "An Architectural Design for Simultaneous Microdiagnostic," Microprocessing and Microprogramming 9, No. 1 (Jan. 1982), pp. 27-37.

D. R. Harper et al, "Concurrent Memory Diagnostics," IBM Technical Disclosure Bulletin, vol. 14, No. 8, Jan. 1972, pp. 2366-2367.

S. R. Sternberg, "Industrial Computer Vision by Mathematical Morphology," Conf. Proc. 13th Intl. Symposium on Industrial Robots & Robots 7, Chicago, Ill., 1983, Apr. 17-21, pp. 17-24 to 17-35.

S. R. Sternberg, "Parallel Processing in Machine Vision," Proc. of the Robotic Intelligence and Productivity Conf., Detroit, MI, Nov. 1983, pp. 35-44.

S. R. Sternberg, "Parallel Architectures for Image Processing," Real-Time/Parallel Computing. Image Analysis Proc. of Part of the JA-US Seminar, Tokyo, JA, Nov. 1978, pp. 347-359.

S. R. Sternberg, "Architectures for Neighborhood Processing," IEEE Comp. Soc. Conf. on Pattern Recognition and Image Processing, Dallas, TX, Aug. 3-5, 1981, pp. 374-380.

Sternberg and Sternberg, "Industrial Inspection by Morphological Virtual Gauging," IEEE Computer Soc. Workshop on Computer Architecture for Pattern Analysis & Image Mangmt., 1983, pp. 237-247.

S. R. Sternberg, "Cellular Computers and Biomedical Image Processing," Publ. by Springer-Verlang, Berlin, West GER & New York, 1982, pp. 294-319.

Mudge et al, "Cellular Image Processing Techniques for VLSI Circuit Layout Validation and Routing," 19th Design Automation Conference, Jun. 1982, Paper 32.2, pp. 537-543.

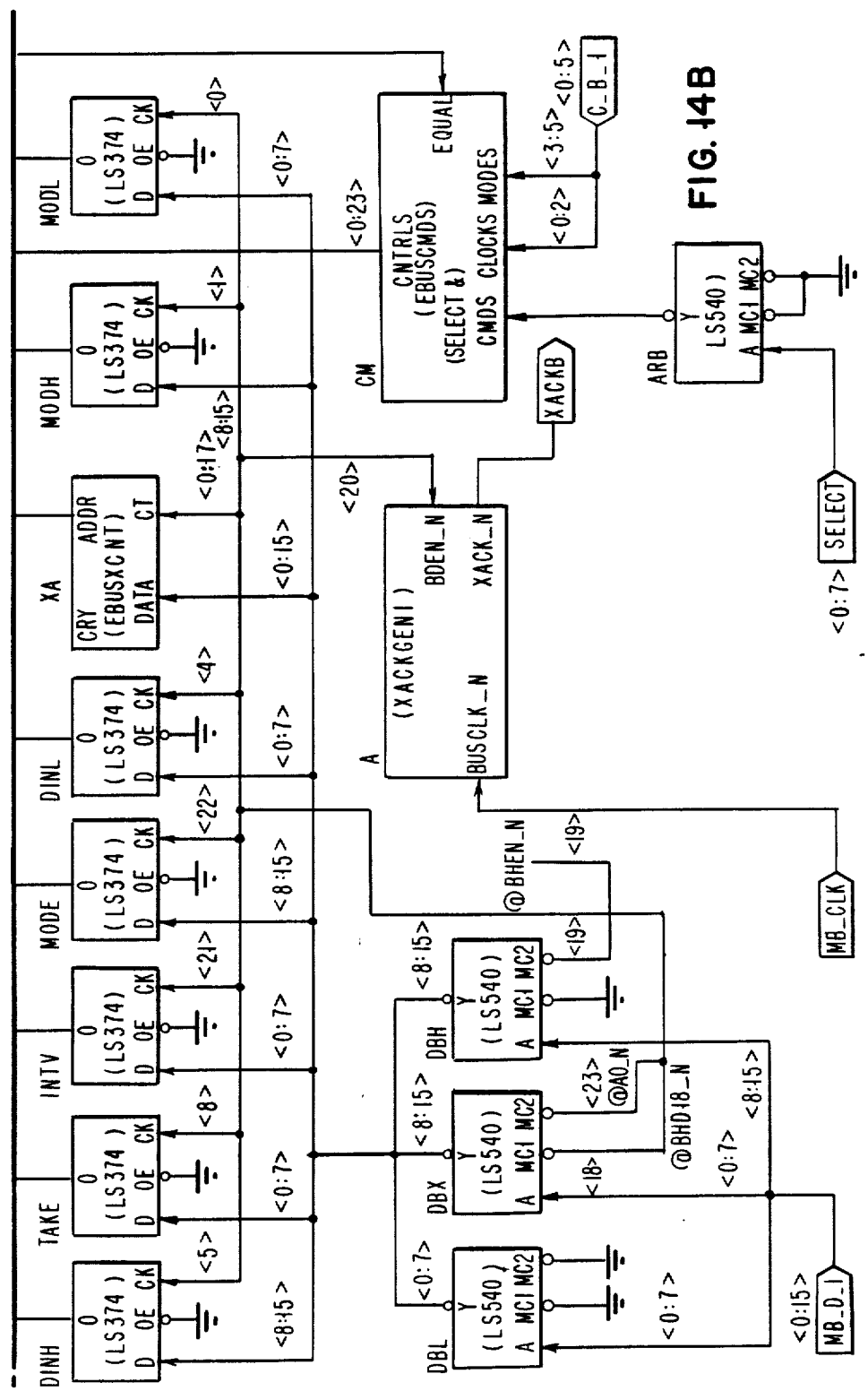

CONFIGURABLE PARALLEL PIPELINE IMAGE PROCESSING SYSTEM

This application is a continuation of application Ser. No. 759,640 filed July 26, 1985.

BACKGROUND OF THE INVENTION

1. Field of the Invention

This invention relates to pipelined image processing systems, and more particularly relates to a parallel pipeline system of image processing elements, which are configurable in sets and partially configurable from set to set within an image processing subassembly, for computational efficiency and economy of memory and bus capacity.

2. Description of the Prior Art

The following United States Patents and other publications are representative of the prior art:

U.S. Pat. No. 3,805,035, Serra, J., DEVICE FOR THE LOGICAL ANALYSIS OF TEXTURES, Apr. 16, 1974, shows image conversions in accordance with predetermined Boolean logical laws.

U.S. Pat. No. 4,395,699, Sternberg, METHOD AND APPARATUS FOR PATTERN RECOGNITION AND DETECTION, July 26, 1983, shows the use of table look-up in a pattern recognition and detection system employing at least one neighborhood transformation stage. The table look-up is not used to control Boolean transformations of the image, but rather is used in a character recognition mode to determine whether neighboring pixels are configured in a preselected pattern.

U.S. Pat. No. 4,395,700, McCubbrey et al, IMAGE ANALYZER WITH VARIABLE LINE STORAGE, July 26, 1983, shows a system for analyzing images, in which each neighborhood transformation stage includes a processor portion for analyzing windows of neighboring pixel values and provides a transformation output as a function of the pixel values contained in the window.

U.S. Pat. No. 4,484,346, Sternberg et al, NEIGHBORHOOD TRANSFORMATION LOGIC CIRCUITRY FOR AN IMAGE ANALYZER SYSTEM, Nov. 20, 1984, shows a system for analyzing images represented by a serial stream of digital pixel signals constituting an image. The system includes a pipeline of substantially identical neighborhood transformation stages. Each stage sequentially provides a window of neighboring pixels to the processor for analysis.

U.S. Pat. No. 4,490,848, Beall et al, METHOD AND APPARATUS FOR SORTING CORNER POINTS IN A VISUAL IMAGE PROCESSING SYSTEM, Dec. 25, 1984, shows an image processor which processes extracted features, using a first microprocessor to control video data processing functions, using a second microprocessor to control subsequent more complex image data processing functions, and using a third microprocessor as the main CPU communicating via a common bus.

(application Ser. No. 06/626,552, filed June 29, 1984), Mandeville, METHOD FOR OPTICAL INSPECTION ANALYSIS OF INTEGRATED CIRCUITS, shows, in an automatic inspection system for intricate devices, a finite-length serial pipeline configuration for processing images.

U.S. patents which provide cumulative pertinent prior art include:

U.S. Pat. No. 4,174,514, Sternberg, PARALLEL PARTITIONED SERIAL NEIGHBORHOOD PROCESSORS, Nov. 13, 1979, shows an image processor technique for operating across boundaries of image segments.

U.S. Pat. No. 4,395,698, Sternberg et al, NEIGHBORHOOD TRANSFORMATION LOGIC CIRCUITRY FOR AN IMAGE ANALYZER SYSTEM, July 16, 1983, shows an image processing system for two-dimensional or three-dimensional image analysis.

U.S. Pat. No. 4,441,207, Lougheed et al, DESIGN RULE CHECKING USING SERIAL NEIGHBORHOOD PROCESSORS, Apr. 3, 1984, shows an image processing system for checking superimposed integrated circuit masks.

U.S. Pat. No. 4,464,788, Sternberg et al, DYNAMIC DATA CORRECTION GENERATOR FOR AN IMAGE ANALYZER SYSTEM, Aug. 7, 1984, shows an adjustment technique for correcting "wrap-around" ambiguity interval.

U.S. Pat. No. 4,484,349, McCubbrey, PARALLEL PIPELINE IMAGE PROCESSOR, Nov. 20, 1984, shows a technique for image processing in a segmented fashion in which pixels lying at segment edges are transferred for processing by another segment and are also retained in output buffers, so that each stage contains all the pixels needed for processing.

U.S. Pat. No. 3,970,993 Finnila, COOPERATIVE-WORD LINEAR ARRAY PARALLEL PROCESSOR, July 20, 1976, shows an array parallel processor with associative addressing. Since words are content-addressed, simple logic can provide self-repair. Finnila may run a test program through the cells, bypassing some cells under program control. Each cell has a plurality of flag positions, and flag data may be processed or transferred. Finnila can bypass a cell, but does not have any reconfiguration capability.

U.S. Pat. No. 3,603,934, Heath, Jr., DATA PROCESSING SYSTEM CAPABLE OF OPERATION DESPITE A MALFUNCTION, Sept. 7, 1971, shows a computer system with redundancy and fault bypass, using multiple passes through the good units if required. The Heath fault bypass might be considered a form of reconfiguration, but it does not provide a reconfigurable image processing system.

U.S. Pat. No. 3,553,654, Crane, FAULT ISOLATION ARRANGEMENT FOR DISTRIBUTED LOGIC MEMORIES, Jan. 5, 1971, shows a fault isolation system for a distributed logic memory. Fault detection controls fault bypass. This is not a reconfigurable image processing system.

U.S. Pat. No. 3,681,578, Stevens, FAULT LOCATION AND RECONFIGURATION IN REDUNDANT DATA PROCESSORS, Aug. 1, 1971, provides a majority voting circuit. This is not a reconfigurable image processor.

U.S. Pat. No. 3,356,837, Raymond, BINARY DATA INFORMATION HANDLING SYSTEMS, Dec. 5, 1967, provides a majority voting circuit. This is not a reconfigurable image processor.

U.S. Pat. No. 3,226,569, FAILURE DETECTION CIRCUITS FOR REDUNDANT SYSTEMS, Dec. 28, 1965, provides a majority voting circuit. This is not a reconfigurable image processor.

U.S. Pat. No. 3,660,646, Minero et al, CHECKING BY PSEUDODUPLICATION, May 2, 1972, provides error detection by pseudoduplication, performing the same operation twice, with different data paths, and comparing the result. While this might be considered a "reconfiguration" in the broad dictionary sense, it does not provide a reconfigurable image processor.

U.S. Pat. No. 4,398,248, Hsia et al, ADAPTIVE WSI/MNOS SOLID STATE MEMORY SYSTEM, Aug. 9, 1983, shows error detection controlled fault bypass to redundant circuitry. This is not a reconfigurable image processor.

U.S. Pat. No. 3,665,418, Bouricius et al, STATUS SWITCHING IN AN AUTOMATICALLY REPAIRED COMPUTER, May 23, 1972, shows error detection controlled fault bypass to redundant circuitry. This is not a reconfigurable image processor.

U.S. Pat. No. 3,419,849, Anderson et al, MODULAR COMPUTER SYSTEM, Dec. 31, 1968, shows error detection controlled fault bypass to redundant circuitry. This is not a reconfigurable image processor.

SU 0543941, Tsiramua et al, Jan. 1977 (USSR Author's Certificate) shows a fault-tolerant system which reallocates functions via a function distributor. This is not a reconfigurable image processor.

JA 54-30383, BACK-UP SYSTEM OF DIGITAL PROCESS CONTROLLING APPARATUS, March 1979, shows error detection controlled fault bypass to redundant circuitry. This is not a reconfigurable image processor.

Publications are:

E. J. Lerner, "Parallel Processing Gets Down To Business," High Technology, Jul 1985, pp. 9-14. Lerner shows a variety of styles and uses of parallel processors.

J. R. Mandeville, "Novel Method for Analysis of Printed Circuit Inmages, IBM J. Res. Develop., Vol. 29 No. 1, January 1985, pp. 73-86. Mandeville shows, in an automatic inspection system for intricate devices, a finite-length serial pipeline configuration for processing images.

R. M. Lougheed, D. L. McCubbrey, "The Cytocomputer: A Practical Pipelined Image Processor," Proc. 7'th Annual International Symposium on Computer Architecture, May 1980, shows a pipelined image processor.

Other publications, considered cumulative, are:

D. Svetkoff, J. Candlish, P. VanAtta, "High Resolution Imaging for Visual Inspection of Multi-Layer Thick-Film Circuits," RI/SME Conference on Applied Machine Vision, Memphis, Tennessee, February 1983, shows an image processor using a gray-scale algorithm to locate and classify flaws.

U. Montanari "Continuous Skeletons From Digitized Images," Journal of the Association for Computing Machinery, Vol. 16, No. 4, October 1969, pp. 534-549, shows an image processing technique involving skeletonizing of digitized images for feature extraction.

R. Stefanelli, A. Rosenfeld, "Some Parallel Thinning Algorithms for Digital Pictures," Journal of the Association for Computing Machinery, Vol. 18, No. 2, April 1971, pp. 255-264, shows a thinning technique operating on an image processor.

S. R. Sternberg, "Biomedical Image Processing," IEEE Computer, January 1983, pp. 22-28, shows an image processing technique involving erosion and dilation of images for feature extraction.

S. R. Sternberg, "Language and Architecture for Parallel Image Processing," in PATTERN RECOGNITION IN PRACTICE, E. S. Gelsema and L. N. Kanal, eds., North Holland Publishing Co., 1980, shows techniques for image processing in an array processor.

K. S. Fu, "Pattern Recognition for Automatic Visual Inspection," IEEE COMPUTER, December 1982, shows techniques for image processing.

R. M. Lougheed, D. L. McCubbrey, S. R. Sternberg, "Cytocomputers: Architectures for Parallel Image Processing," Proc. IEEE Workshop on Picture Data Description and Management, August 1980, pp. 281-286, shows architecture and operation techniques for image processors.

M. A. Hegyi, R. W. Kelley, D. L. McCubbrey, C. B. Morningstar, "Computer Algorithms for Visually Inspecting Thick Film Circuits," Environmental Research Institute of Michigan, shows operation techniques for image processing.

Hopkins, Jr., et al, "FTMP - A Highly Fault-Tolerant Multiprocessor for Aircraft," Proceedings of the IEEE, Vol. 66, No. 10, October 1978, pp. 1221-1239, shows error detection controlled fault bypass to redundant circuitry. This is not a reconfigurable image processor.

J. Losq, "A Highly Efficient Redundancy Scheme: Self-Purging Redundancy," IEEE Transactions on Computers, Vol. C-25, No. 6, June 1976, pp. 569-578, shows error detection controlled fault bypass to redundant circuitry. This is not a reconfigurable image processor.

C. V. Ramamoorthy et al, "Reliability Analysis of Systems with Concurrent Error Detection," IEEE Transactions on Computers, Vol. C-24, No. 9, September 1975, pp. 868-878, shows error detection controlled fault bypass to redundant circuitry. This is not a reconfigurable image processor.

A. Bautista et al, "An Architectural Design for Simultaneous Microdiagnostic," Microprocessing and Microprogramming 9, No. 1 (Jan. 1982), pp. 27-37, shows normal program execution simultaneous with diagnostics program execution.

D. R. Harper et al, "Concurrent Memory Diagnostics," IBM Technical Disclosure Bulletin, Vol. 14, No. 8, January 1972, pp. 2366-2367, shows normal program execution simultaneous with diagnostics program execution.

S. R. Sternberg, "Industrial Computer Vision by Mathematical Morphology," Conf. Proc. 13th Intl. Symposium on Industrial Robots & Robots 7, Chicago, Ill., 1983, Apr. 17-21, pp. 17-14 to 17-35, shows an image processor technique for computer vision. There is no reconfigurability shown.

S. R. Sternberg, "Parallel Processing in Machine Vision," Proc. of the Robotic Intelligence and Productivity Conf., Detroit, MI., Nov. 1983, pp. 35-44, shows the use of parallel image processing in machine vision.

S. R. Sternberg, "Parallel Architectures for Image Processing," Real-Time/Parallel Computing. Image Analysis Proc. of part of the JA-US Seminar, Tokyo, JA, Oct. Nov. 1978, pp. 347-359, surveys parallel architectures and operating techniques for image processing, but without the reconfigurability feature.

S. R. Sternberg, "Architectures for Neighborhood Processing," IEEE Comp. Soc. Conf. on Pattern Recognition and Image Processing, Dallas, TX., Aug. 3-5, 1981, pp. 374-380, surveys architectures for neighborhood processing, including serial array processors of several types. One type, the parallel partitioned serial array processor, ". . . takes the form of two or more serial array processors adapted to simultaneously process separate, contiguous segments of a data matrix . . . " so the ". . . two serial array processors . . . equally divide the task of transforming a single data matrix."

Sternberg and Sternberg, "Industrial Inspection by Morphological Virtual Gauging," IEEE Computer Soc. Workshop on Computer Architecture for Pattern Analysis & Image Mangmt. 1983, pp. 237-247, show the use of image processing for "virtual gauging," where the shape of the gauge is determined using software. There is no reconfigurability feature.

S. R. Sternberg, "Cellular Computers and Biomedical Image Processing," Publ. by Springer-Verlang, Berlin, West GER & New York, 1982, pp. 294-319, shows the use of image processing in biomedicine, using image algebra in a pipeline image processor for body cell analysis. There is no reconfigurability feature.

Mudge et al, "Cellular Image Processing Techniques for VLSI Circuit Layout Validation and Routing," 19th Design Automation Conference, June 1982, Paper 32.2, pp. 537-543, shows the architecture of a pipelines cellular image processor. "Shift registers within each stage stores two contiguous scan lines while window registers hold the nine neighborhood pixels which constitute the 3×3 window . . . performs a preprogrammed transformation . . . [O]perations which do not involve the states of a pixel's neighbors . . . are performed in a separate point-by-point logic section to simplify the neighborhood logic circuit . . . " (p. 538). There is no reconfigurability feature.

The prior art shows a variety of pipeline processors, and shows that such pipeline image processors are advantageous in that many computations are done simultaneously without constant memory accessing of intermediate results. The term "image" is used in the broadest sense, covering spatially or temporally related information. The prior art however does not teach nor suggest a configurable network system architecture to carry out high speed pipelined processing of very large numbers of window images, with efficient use of hardware, by using a host computer to reconfigure a limited set of hardware to set up the system as an efficient image processing network for the particular job.

SUMMARY OF THE INVENTION

The object of the invention is to approach both the flexibility of a general purpose binary image processor and the computational efficiency and speed of pipeline processing.

A more specific object of the invention is to extend pipeline processing to a generalized network of processing elements (parallel-serial in any configuration) and image combination elements.

Another more specific object of the invention is to carry out high speed pipelined processing of very large images with efficient use of hardware.

A feature of the invention is an architecture using software to configure a hardware network for efficient high speed pipelined image processing; limited hardware is set up in an efficient image processing network for the particular job.

A feature of the invention is its configuration of image processing elements (PEs) and image boolean combiners (BSs) along a bus so as to set up an efficient pipelined image processing system for the job contemplated.

Another feature of the invention is a processing elements having a window array and having neighborhood function logic with a feedback connection, thus providing as output a composite function of the current image plus the previous image.

The invention features configurable unitary processing element groups (PEGs), each PEG having a number of processing elements (PEs) and boolean combiner image switches (BC) arrayed in image processing subassembly (CAGE) having significant but still finite configurability. This provides myriad image processing networks without the massive investment in memory and bus capacity required to provide all possible networks. PEs have full connectability to all PEs within the PEG. Each PEG has a direct pipeline connection to the next PEG. A limited number of PEs in each PEG are connectable to PEs in other PEGs via a bus. For simple jobs, the implementor configures simple networks of PEs within a PEG. For a job too demanding for simple networks, the implementor configures PEs in one PEG together with PEs in other PEGs, in a compound bus-connected network. For very demanding jobs, too demanding for compound networks, the implementor uses PEs in complex networks, not only as binary window processors, but also as additional switching paths, logic inverters, and delay elements.

The system features a host computer, video buffer, and one or more CAGEs each having one or more bit stream inputs, an array of PEGs and an enumerator (ENUM). Image switches are implemented by a shared boolean combiner (BC) for each PEG. Extra-CAGE connections are by a Distributor D 11. An Enumerator E 12 counts cycles to determine the X-Y coordinates of "on" pels of selected images, and communicates these coordinates as output data to the host computer.

An advantage of the invention is its inherent capability of processing a number of different images, each to a different degree of detail, beyond reasonable capability of hardwired network processors.

Another advantage of the invention is maximizing both flexibility and efficiency of available image processor hardware by configuring networks for the job contemplated, with easy changeover.

Another advantage of the invention is that it combines the pipeline capability, walking many computations simultaneously through the system without constant memory accessing of intermediate results, with the capability of configuring complex networks specific to each type of job.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 1 shows the architecture of the configurable parallel pipeline image processing system.

FIG. 2 is a block diagram of a representative configurable unitary processing element group (PEG).

FIG. 3 is a block diagram of a representative image processing element (PE), equipped fully for efficient image processing according to the invention.

FIG. 4 is a block diagram of a standard 3×3 neighborhood PE as is known in the art.

FIG. 5 is a block diagram of a preferred individual processing element (PE), for effective image processing according to the invention, more fully equipped than is the standard 9-bit PE shown in FIG. 4, but not equipped as fully as the PE shown in FIG. 3.

FIG. 6 is a schematic block diagram of a small but typical network of PE's attainable by the invention.

FIG. 7 shows details of the PEG, with cross references to other figures.

FIGS. 7-13 show implementation details of a PEG.

FIGS. 14-15 show implementation details of the distribution and enumeration functions of the system.

DESCRIPTION OF THE PREFERRED EMBODIMENT

Figure 1:
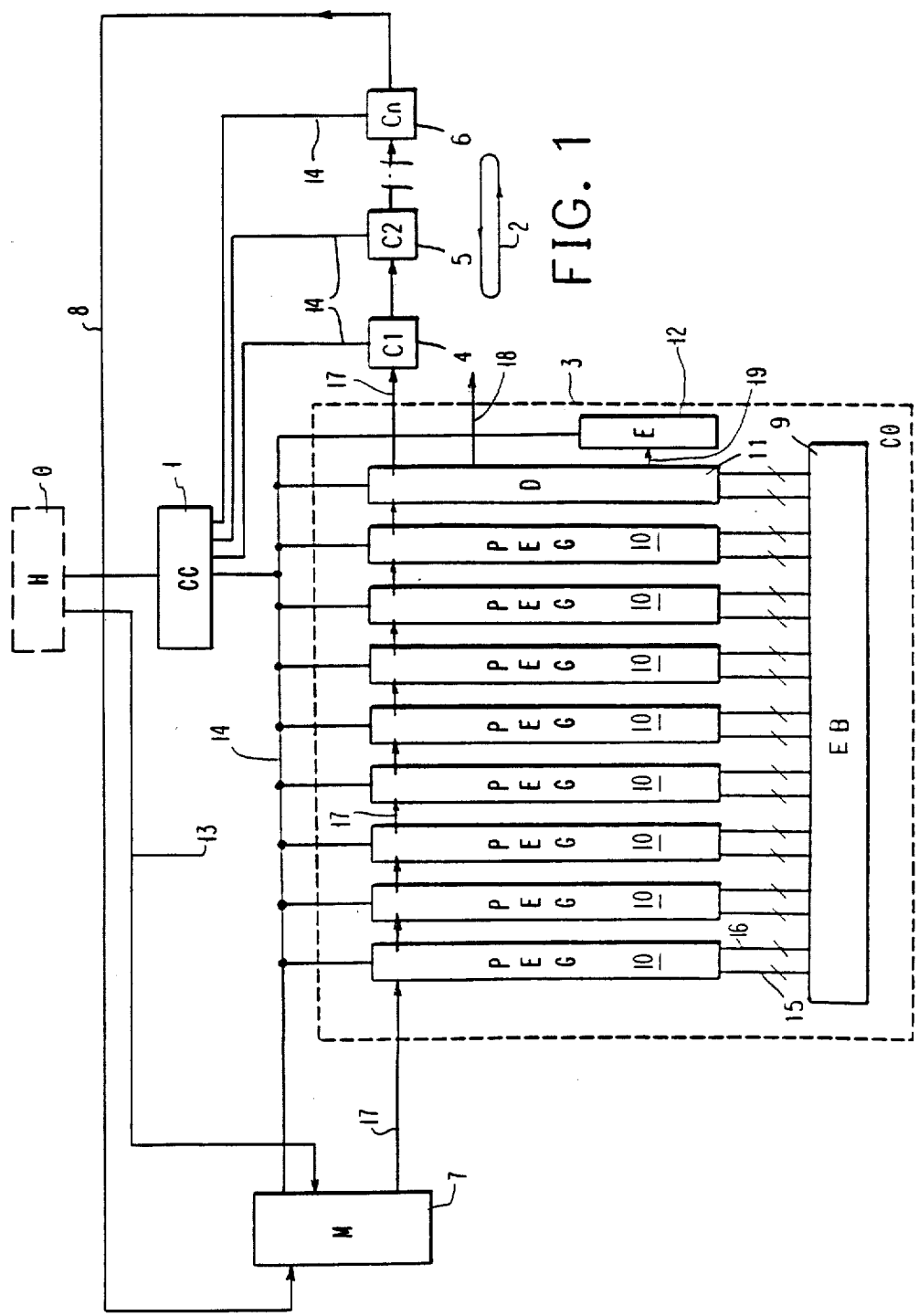
FIGS. 1-6 are overall schematic diagrams of the configurable image processing system, presented as functional units in context for explanation and understanding.

FIG. 1. Network of Processing Element Groups and Enumerator Elements Configured for Pipelined Image Processing FIG. 1 is a logical block diagram of the configurable image processing system. A host computer, which may be an IBM PC with a Bit-3 card plugged to a multibus, provides overall control of the system, its input video acquisition mechanisms and its output utilization mechanisms. Other available host computers would suffice. The host computer 0 (H) provides overall control, according to its stored program, via control card 1 (CC) to an image processing pipeline of processing elements (PEs) operating in an iterative loop diagrammatically shown by arrow loop 2. A typical PE is a nine-neighbor morphic operator. Such binary window processing elements (PEs) described here are equivalent to the basic processing elements described by Jon R. Mandeville in U.S. Patent Application serial number 06/626,552, filed June 29, 1984, supra. The image processing pipeline includes CAGEs C0, C1, C2 ... Cn, indicated respectively as boxes 3,4,5 and 6, and video buffer 7 (M), connected by return loop 8. Representative CAGE C0 is shown in detail. Cage C0 comprises enumerator bus (EB) 9 and a set of M configurable universal processing element groups (PEGs) 10. Each PEG 10 includes a set of N processing elements, and also includes a set of (N+P) in, 2N out image switches, implemented by shared boolean combiners (BCs). The 2N set of image switches permits universal variability of interconnection for the N processing elements in the set, and significant variability of interconnection for processing elements in other sets via the P extra image switches and the enumerator bus 9 (EB), and J connections to EB 9. For example, there may be eight PEs in the PEG, interconnected in any configuration; there may be four inputs from other PEGs via the EB, and there may be four outputs to other PEGs via the EB; that is, N=8, P=4 and J=4.

Ordinary connection from a PEG 10 to another PEG 10 within the CAGE is sequential, along a line 17. The last PEG in the CAGE connects to distribution logic (D) 11 via a line 17. Ordinary connection from CAGE to CAGE is in ascending sequence only, by distribution logic (D) 11 and enumerator (E) 12. Connection to a CAGE not in ascending sequence may be made by going through video buffer 7 through the pipeline of CAGEs 3,4,5 ... 6, and back along feedback loop 8 for another iteration. Image load and image transfer is by image bus 13, which serves video buffer 7. Image data of traditional iconic presentation via video buffer (M) 7 over line 13. The image enters the pipeline of CAGEs C0 ... Cn from video buffer 7 via line 17. In operation, no "image" of traditional iconic presentation ever goes back to the host. Optionally, video buffer 7 and the pipeline of CAGEs C0 ... Cn can be used iteratively for small images by re-entering video from the pipeline over line 8 to video buffer 7. Data items which actually does go back to the host from the pipeline comes from enumerator E 12 as a type of compressed data. The compressed data comprises the X-Y or time address of each "on" pel of the image. Each "on" pel is a bit, normally with bit value "1," representing the smallest toned area (usually black) in the image. Images suitable for the enumerator (ENUM) are very sparse iconic images. Image transfer is by spatial coordinates, a minimal digital representation of pel location. The Enumerator (E) 12 identifies, to the host computer 0, an identification of a selected image by a set of X-Y coordinates at a time known to correspond to arrival at the appropriate PE of the image identifiable by that PE. This representation is ideal for use by a host computer of the digital stored program type. In a typical operation, such as the tester described by Mandeville, supra, the desired mode is to identify and locate particular features, such as conductor breaks in an integrated circuit, at unknown locations in the video image. Once identified and located by the image processing function, the features are communicated to the host computer in X-Y coordinate form and are processed for location and type of feature. During operation, information flows continuously through the pipeline, with only an occasional feature identification being reported to the host computer 0. Video buffer 7 is a first-in-first-out (FIFO) buffer. If all processing can be done in a single pass through the pipeline, video buffer 7 serves as a speed matching buffer, to match image source speed and pipeline image processing speed should a burst of feature identifications occur at such close intervals as to oversubscribe the communication or processing capability of the system. If all processing can not be done in a single pass through the pipeline, video buffer 7 not only serves as a speed matching buffer, but also serves as a second pass image buffer.

Actual video images are inappropriate for the extracted, compressed non-iconic image processing by the host computer 0, because of the vast numbers of bits required. As an example chosen for mathematical convenience rather than close relation to an actual video system, a 1000×1000 raster requires 1,000,000 bits for each image. If the image is cycling at speeds of 5 Hz, this requires 5,000,000 bits per second per image. Thus, iconic image processing by the host computer 0 would take immense amounts of processing memory and bus capacity. Use of gray scale would multiply the complexity. The host computer 0, while used to *to acquire* iconic images, is not used to *to process* iconic images; iconic images are processed in the pipeline.

Control is shown schematically as pipeline control lines 14. Complex hardware networks of processing elements (for example, 256 binary window processing elements) can be configured, or connected, by software means, via host computer (H) 0 and control card (CC) 1 over control lines 14.

When PE's are appropriately interconnected to other PE's, the resulting hardware is capable of a large number of concurrent pipelined operations on a large number of PEs. This concurrency can be obtained irrespective of the way the outputs of the PEs might be logically combined. These connections can also be made across CAGE boundaries via the distributor function of D 11. A sending PE image may be augmented by data from a second or additional sending PE so as to provide a combinatorial input for table lookup prior to image transfer to a receiving PE.

Iconic image transfer between PEGs within each CAGE, and transfer between CAGEs, is by lines 17. A separate line 18 carries the selected iconic image for transfers from CAGE to CAGE not in sequence. Line 19 is a communication between D and E.

The system operates with finite bus capacity, and yet is modular in its manufacture, because each CAGE includes its own repowering repeating mechanism 20. The repowering repeating mechanism 20 does not perform any logical change; it merely repeats the signals on lines 14 with appropriate power levels for the receiving circuits.

The system operates with finite memory, and yet has capability to process very large images because the full iconic image need never be held anywhere in the system. For example, the last PE in the pipe may be working on the first bit of the image while the first PE is working on the nth bit. Except during peak enumeration times when images must be held static while other components catch up, image processing is constant. Processing efficiency is high because the configuration of the hardware can be adapted to the particular image characteristics of the job. The system can function as a special purpose machine just for the type of job contemplated; then the system can be reconfigured for another type of job. The software for configuring the hardware network is not similar to standard step-by-step computer programming, which directs data flow through a sequence of processing steps, but rather comprises machine reconfiguration statements. The manner in which the hardware functions is established by the contents of certain registers and memories. Hence, once configured, the hardware runs at the same fixed rate irrespective of how the PEs are interconnected. For example, at a shift rate of 5 MHZ, with 256 PEs, an effective computational power of 1.25 GIGAOPS is attained. (GIGAOP = 1000 million operations per second.)

Mandeville (supra) provides a description of the rationale behind the requirements for a network of PEs. Complex networks are efficient in image processing jobs such as printed circuit inspection, blood testing or character recognition, but are very demanding of hardware, particular memory. This patent specification provides for easy reconfiguring of complex networks to the maximum possible with limited memory or limited bus channel width or limited number of PE's, for maximum efficiency, and subsequently for easy reconfiguration to another job.

Figure 2:
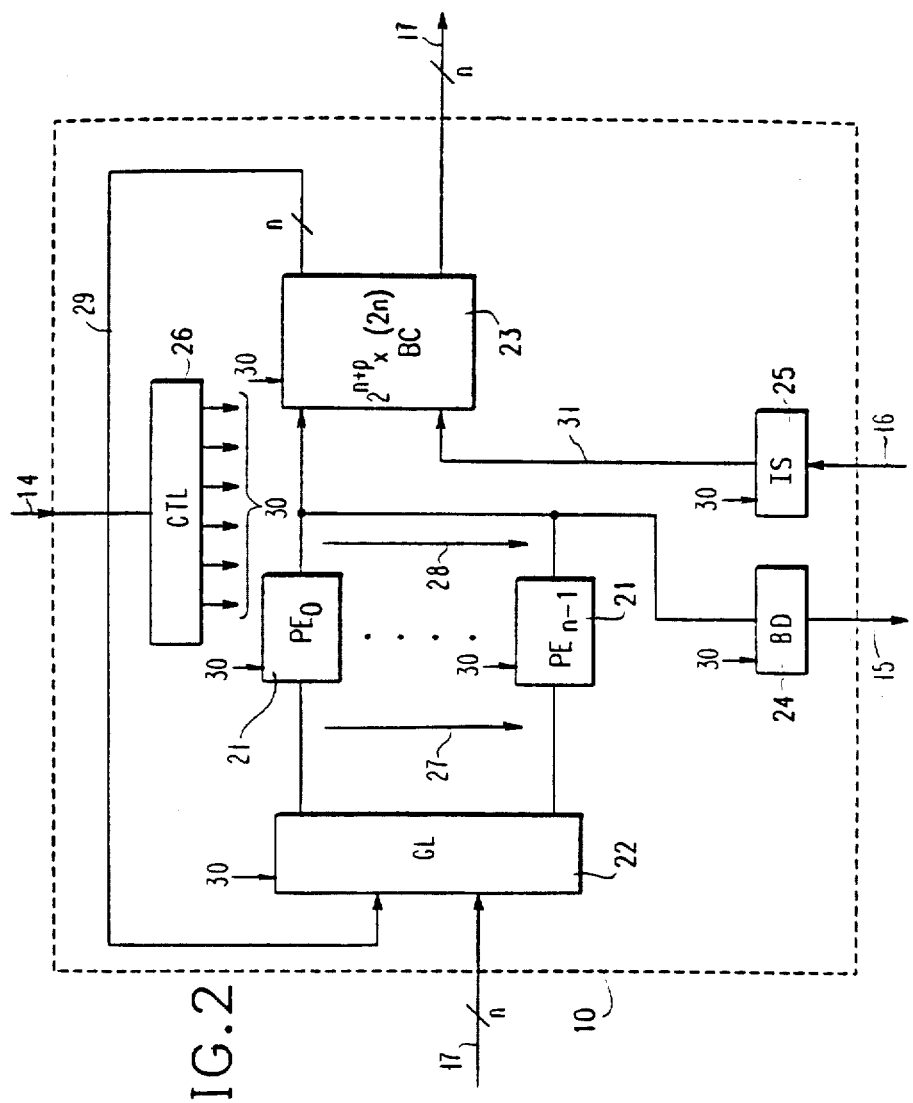

FIG. 2. The Processing Element Group (PEG)

FIG. 2 is a detail of the Processing Element Group (PEG) 10. The PEG comprises N Processing Elements 21, PE0 . . . PEN-1, the Boolean Combiner Function (BC) 23, Bus Distribution Logic (BD) 24, Input Selection Logic (IS) 25, Gating Logic (GL) 22, and Control Logic (CTL) 26.

A Processing Element 21 is hereinafter referred to as a PE. The Ith ($0 \leq I \leq N-1$) PE 21 of N receives a single sequential image stream on the Ith instance of line 27 one image picture element (hereafter referred to as a PEL) at a time. The Ith PE 21 produces a single sequential transformed image stream on the Ith instance of line 28 some constant number of PEL times later. A PE 21 can be a simple, or as complex (within cost of engineering realities) in function as the system designer chooses. Detail of a typical PE implementation is discussed later under FIGS. 3-5. However, the key to system flexibility is that each PE be capable of implementing any image stream transformation which might be required. This reconfiguration of function is particular easy to do for image processing systems of the type presented here because processing requirements do not require the PE functions to change during execution or run time. Hence the particular image transformation function to be done by each PE can be established during the setup or configuration time at a rate much less severe than the image processing rate. Thus, for the image processing tasks addressed by this invention, the range of capability of a PE can be made completely general, and the system can be made completely reconfigurable.

The Boolean Combiner 23 is hereafter referred to as the BC. The BC is a device for producing up to 2N distinct sequential boolean functions of the N+P image streams on the N lines 28 and the P lines 31. One bit from each of the N+P image streams arrives at the input of BC (23) each pel time. The output pel (one bit) of each of 2N image streams is produced each pel time, some constant number of pel times later, N bits on lines 29 and N bits on lines 17. The BC is mot easily implemented with a memory having an N+P bit address, and with 2N bits per word. This guarantees each of the 2N outputs can be any function of the N+P inputs. When N+P is larger than the prevailing state of the art for cost effective memories, then the function of the BC will either be less general or more costly in terms of hardware and computation time. Using a RAM for the memory, the output can be produced in only one pel time. Other implementations may require a computational time of more than one pel, which is quite permissible in this system because everything is being done in parallel in a pipelined fashion. Our assertion that each of the 2N outputs can each be a separate independent function of the N+P input image streams should be clear to anyone skilled in the art. Hence, the BC 23 functions both for logically combining image streams, and for switching image streams to the input of the next PE in the network, irrespective of whether the PE is in the same PEG along line 29, or in the subsequent adjacent PEG along lines 17.

The Gating Logic 22 is hereafter referred to as the GL. The GL determines whether the N input streams on lines 27 which constitute the inputs to the N PEs 21 come, on a bit by bit basis, from the previous PEG over lines 17 or from the output of this PEG's BC 23 over lines 29. This is easily implemented as N independent 2 way multiplexors, controlled on a bit by bit basis over lines 30 by an N bit register located in the Control Logic 26. It should also be apparent that, when both lines 17 and lines 29 come from BC outputs which can be programmed to any function, then the gating logic GL 22 can be implemented as N two-way OR functions, without requiring any gating control.

The Bus Output Distribution logic 24 is hereafter referred to as the BD. The Enumerator Bus 9 is hereafter referred to as the EB. The BD is responsible for driving J of the N PE 21 outputs on lines 28 to a specific set of EB 9 positions within lines 15 according to the specific identity (address) of this PEG. Each individual PEG will have a separate identity. The identity determines which J of the lines 15 within the EB 9 that a PEG uses for sending J of this group's PE image streams to other PEGs 10 and to the Distributor logic 11. The address of each PEG is discussed further in the description of the Control Logic 26. One very simple scheme for choosing which of the EB 9 lines 15 a given PE 21 output I ($0 \leq I \leq J-1$) will be connected to by BD 24 is to place the Ith signal of the Qth ($0 \leq Q \leq M-1$) PEG on bit JQ+I of EB 9, where M is the number of PEGs within a given CAGE 3.

The Bus Input Selection Logic 25 is hereafter referred to as the IS. The IS 25 will select a given subset P of the MJ total images on lines 16 of the EB 9 all according to selection information which is held in the control logic 26. The richness or sparseness of the selection capability of the IS 25 is again a system choice, and depends upon the amount of flexibility which is considered necessary to implement networks of PEs in the full system to the complexity required by the application.

A comment on timing or computational delay is in order at this point, now that the structure of the PEG has been described. Images flow from one PE to another in pipelined fashion. Images are made up of pels, or bits, which move through the pipeline, one pel per clock or shift time. The design goal must be to keep everything in synchronization regardless of the path that any image takes on its way from one PE to another, irrespective of where in the hardware each PE is located, and irrespective of the type of computation or logical operation which is performed by each PE, by each BC, and by the other functions all within the PEG. Each of the functions within a PEG, namely the GL, PE, BC, BD, and IS functions, have their own variable and selectable capabilities. Thus the paths for the image streams through the "configured" network of PEs must be the same "distance" or clock times or number of pel delays regardless of which path or paths it takes at any local level through any function. For example, the path from a PE 21 to a BC 23 must be the same number of pel times regardless of path. The possible different types of paths which can be taken within a CAGE (CAGE to CAGE paths will be discussed later in connection with the Distribution Logic D 11 and the Enumerator E 12) are three as follows:

1. PE to a BC, both within the same PEG, along the path of lines 28.
2. PE to a BC, both within the same PEG, along the path of lines 28 through BD 24 to EB 9 hence back from the EB 9 through IS 25 and along lines 31.
3. PE of one PEG to a BC of a different PEG, along the path from lines 28 through BD 24 to EB 9 hence back from the EB 9 through the IS 25 of the destination PEG and along lines 31 hence to the BC 23.

While it might appear that this is a difficult task, the reader is reminded that these delays must only be in an integral number of pel times. Hence, if the paths two and three in the previous example take two pel times, then a two pel delay must be added somewhere in the path from the PE 21 to the BC 23 without changing the delay from the PE 21 to the BD 24. For clarity, this delay compensation if required is included as part of the function of the various portions of the PEG and is not shown as a separate function at the level of detail shown in FIG. 2. There are, for example, finite delays in passing through the PEs 21 in line 28. These delays require proper timing. It will also be clear to one skilled in the art that the BC for instance can have any internal delay whatsoever, so long as that delay is constant for each BC in each PEG in each CAGE over the whole system for each and every function which must be performed by the BCs for a given network configuration. It is possible that the delay within the BCs of one configuration is different from the delay of the BCs of a different configuration. This causes no problem. What must remain fixed and equal is the delay of all BCs within a given configuration irrespective of the function (and this implies irrespective of the data also) that each is performing. This same comment holds true for each of the functions within the PEG.

The Control Logic 26 is hereafter referred to as the CTL. It provides paths by which the host 0 can communicate the setup information to the individual PEGs 10 and to ENUM 12. This includes the addressing lines and data paths for establishing the contents of various memories which may be used to implement the required functions. The CTL also includes registers and memories which control the paths, within GL 22, BC 23, BD 24 and IS 25, that different image streams will take. The CTL logic 26 also functions to repower clocks and mode signals for use within the PEG, along lines 30. Finally, CTL 26 includes some addressing mechanism for distinguishing one PEG from another, so that the personalization or configuration can take place. The PEG identity is part of the hardware and is not electronically reconfigurable. This PEG identify comes from "switches" located with the group hardware which are established at the time the hardware is plugged into the EB 9. The simplest mechanism for this is mechanical switches which are set up prior to the time the PEG hardware is inserted into the CAGE. Another possible mechanism may be through addressing which is in effect depending upon which position within the CAGE a given group is installed. That is, the address is determined by the wiring of the CAGE. Another mechanism could be through communicating to each PEG in sequence during setup time using coded information within the image stream. This latter approach would be quite desirable for very large scale integration. A group address, though it might be established during setup for each group in turn by some programming mechanism, must be thought of as fixed for the remainder to the setup time while configuration information is being sent to each group individually.

Figure 3:
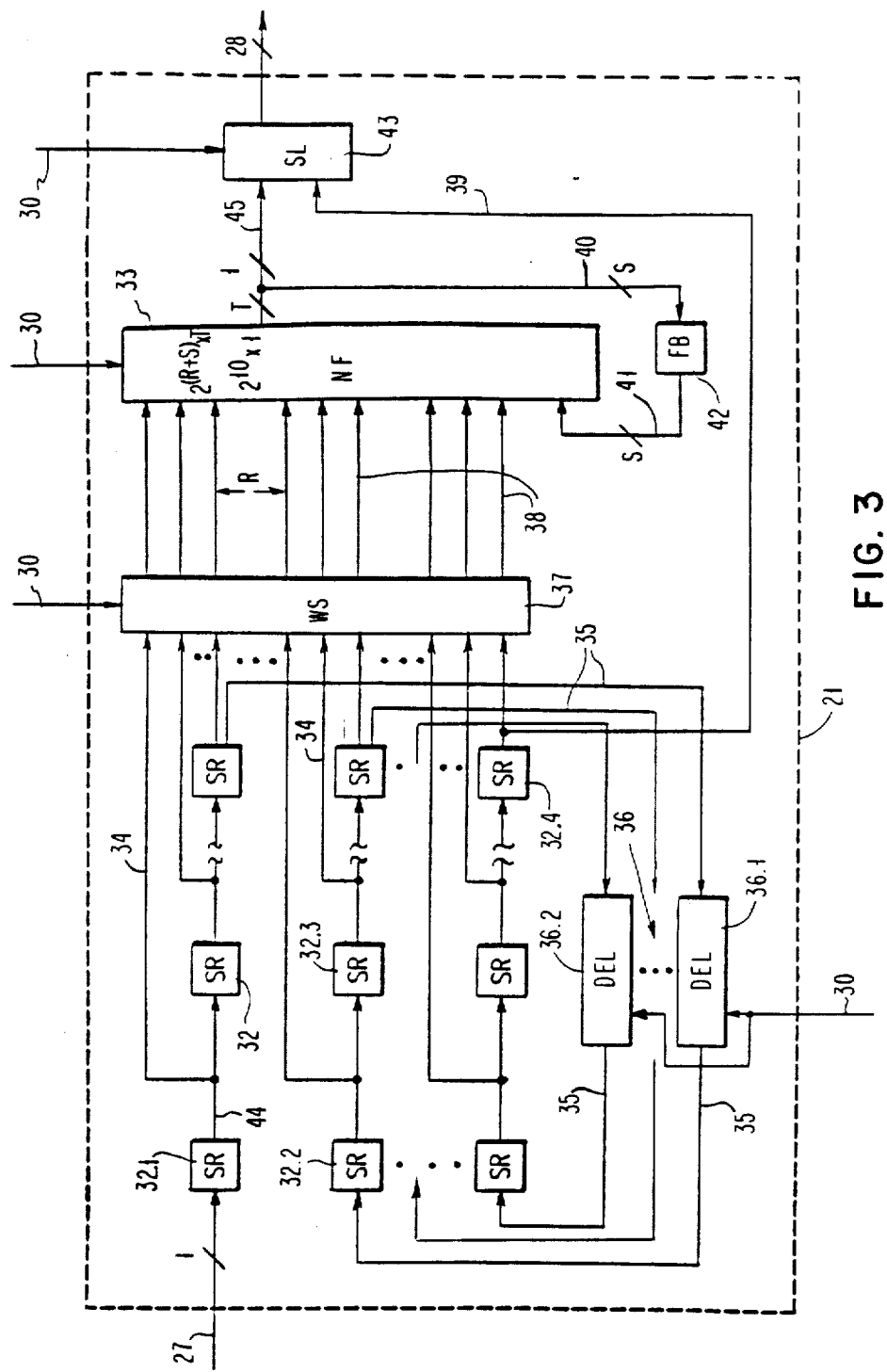

FIG. 3. Enhanced Function Processing Element, An Image Window with Neighborhood Function Computation FIG. 3 is a detail of one Processing Element 21. This version of a PE 21 has a number of features to enhance its function over the classical PE which will be discussed later, in connection with FIG. 4. The PE 21 is comprised of a number of Shift Register Bits (SR) 32, Delay Elements (DEL) 36, a Neighborhood Function Logic (NF) 33, Feedback Register (FB) 42, Window Selection Logic (WS) 37, and Output Select Logic (SL) 43.

An observation about the computational requirements of PE should be made here. There are two distinct types of image processing operations which are most easily done in the PEs. They are image transformation and image translation. Transformation implies local change. Translation implies spatial displacement. The locality of change on transformation operations is the neighborhood. For each pel in the original image, the corresponding pel in the resultant image is a function of pels in the image neighborhood of its corresponding pel in the original.

A Shift Register Bit circuit 32, which holds exactly one pel, is hereafter referred to as a SR. Several SRs 32 are connected to each other via lines 44 and to additional Delay Elements 36.1, 36.2 via lines 35 to form one continuous sequential chain. The first SR 32 in the chain, SR 32.1, receives the image stream over line 27. Some or all of the SRs 32 are connected via lines 34 to the Window Selection Logic 37. The image arriving at the PE 21 over line 27 is a sequential stream of pels which shift one pel position each SR shift time. The function of the SRs 32 is to hold at each pel time a particular small portion of the whole image to make the pels in that portion of the image available to the Neighborhood Function Logic 33 for the image transformation computation. It should be apparent that the amount of delay provided by Delay Elements (DELs) 36, the width of the image being presented by the image stream on line 27, and the particular SRs 32 selected via Window Selection Logic (WS) 37 for presentation to the Neighborhood Function Logic (NF) 33, determine the spatial relationship among the bits of the image which are available to the Neighborhood Function Logic 33. A specific set of pels from the SRs 32 forms the image window or neighborhood. Although traditional image processing terminology usually refers to the bits which appear in a square image window as the neighborhood, there is actually no requirement that the bits in the neighborhood be adjacent pels. The selection of the window is rather determined by the particular image processing operation which a particular PE is to perform.

OUTPUT pel(i)=Function of (INPUT pel(i) and Neighborhood of (i))

Another image processing operation, translation, is simpler than the neighborhood operation. Each output pel is exactly the same as an input pel which is a constant "distance" away.

OUTPUT pel(i)=INPUT pel(i−J) J a constant.

A Delay Element 36 is hereafter called a DEL. The function of the DELs 36 is to delay portions of the image stream so that (usually) vertically neighboring bits from two or more rows of the image appear in the appropriate SRs 32 and hence in the neighborhood. The number of DELs is usually one less than the maximum number of rows of the image which will ever appear in a single window. The DELs 36 may be implemented by a programmable delay line, a long shift register with selectable taps, or with a first-in-first-out (FIFO) memory with a programmable offset being made by keeping a constant offset between the read address (output) and write address (input) registers controlling the FIFO. In any case the function of the DELs is to provide a programmable (selectable) amount of delay in terms of number of pels. This delay function is easily implementable by one skilled in the art of digital design. The amount of the delay provided by the DELs 36 is communicated to the DELs over lines 30 from the CTL 26 of FIG. 2.

The Neighborhood Function Logic 33 is hereafter referred to as the NF. The NF 33 receives R inputs over lines 38 from the Window Selection Logic (WS) 37 and S inputs over lines 41 from the Feedback Register (FB) 42. The NF 33 uses these R+S inputs each pel time to compute T output functions, one output which goes to the Selection Logic (SL) 43 over line 45, and S outputs which go over lines 40 to the Feedback Register (FB) 42. (S≦T≦S+1) There is no fixed requirement that the NF 33 produce its result in one pel time unless there is feedback through the Feedback Register (FB) 42, i.e. unless S>0. The NF 33 must (line every thing else in the pipeline) produce one set of T outputs each pel time. (The function of the Feedback Register 42 becomes difficult to fathom if the production time exceeds one pel time.) It should be obvious to anyone skilled in the state of the art that a very easy implementation of the NF 33 occurs if R+S is a reasonably small number, say less than 16 or so. In such case, the NF 33 is most easily done by an R+S bit address Random Access Memory RAM with T bits per word. Other solutions when R+S is a larger number than can be economically accommodated by RAMs are also available, and their choice is usually one of engineering cost and utility and system capacity. The path lines 30 into the NF 33 is the path over which configuration data will arrive at the NF 33. Irrespective of way the NF 33 are implemented, this data will be sent from the Host 0 through CC 1 and the CT 26 (see FIGS. 1 and 2) during configuration time, to establish the specific image transform operation which will be performed by each NF of each individual PE. It should also be clear to one skilled in the art that the ability of the hardware to be configured in a variety of networks is independent of the choice of PE function or the type of PE implementation.

The Feedback Register 42 will hereafter be referred to as the FB. The FB 42 receives S bits of input over lines 40 and produces S bits of output over lines 41. In essence the FB 42 is just another delay, serving to hold S of the NF output bits for one pel time so that the S output bits from the NF 33 can be fed back into the NF 33 at the next pel time. Note the NF plus FB combinations. During run time line 30 is not used, the NF functioning according to information already received over line 30 during configuration (setup) time. Hence, during run time, the combination of NF 33 with FB 42 looks just like a classical Finite State Machine (FSM) with R independent inputs, S dependent inputs derived by delaying S of the outputs, and one independent output. As has already been mentioned such an FSM can be built by a RAM implementing the NF plus a FB 42 Register. It can also be built by a writable PLA with output latches fed back, or it can be built by a content addressable memory CAM. It should be clear to one versed in the art that the choice is related to the size of the largest neighborhood that the NF must handle, the maximum capacity of the function to be done on the neighborhood, and to cost and speed tradeoffs.

The Window Selection Logic 37 is hereafter referred to as the WS. The WS 37 receives the pels from some number of the SRs 32 over lines 44 and sends R pels to the NF 33 over the R lines 38. The WS 37 can be thought of as a simple multiplex or selection tree which allows a wider variety of spatially related pels in the SRs 32 to be made available to the NF 33 than if the SRs 32 were input directly to the NF 33. The given function of the WS 37 can be selected via information received over lines 30 during configuration time. The Output Selection Logic 43 is hereafter referred to as the SL. The SL 43 receives one input over line 45 from the NF 33 and one input over line 39 from one SR 32.4. A function of these two bits determined by the setup information on lines 30 is output on line 28. The primary use for the SL 43 is to implement large translations (i.e. large delays). These delays are most useful for the following reason: In a neighborhood of three rows and three columns, and with the center bit as the reference input pel, the output pel is *at a minimum delayed by one row and one column from the input pel at the start of the stream*. Large delays of greater than two rows can be obtained by the path from SR 32.4 along 39 to SL 43, by setting the delay of DELs 36.1 ... 36.2 to much greater than the image width. This delay however can only be obtained from a single PE of the type shown here if no transformation is performed in the NF 33. Recalling the image processing types, image transformation and image translation, the usefulness of this capability will be discussed later in connection with balancing delays in network of PEs, FIG. 6.

An observation on timing or computational delay is in order at this point: The points to be emphasized are very similar to the same discussion relative to the timing delays within the PEG (see discussion of FIG. 2.) Images flow from one PE 21 to another in pipelined fashion and thence within a PE to the NF 33. Images are made up of pels or bits which move through the pipeline, one pel per clock or pel time. The design goal must be to keep everything in synchronization regardless of the path that any image takes on its way from one NF 33 to another, irrespective of where within the PEG each PE and hence each NF is located, and irrespective of the type of computation or logical operation which is performed by each NF, and by the other functions within the PE. Each of the functions within a PE, excluding the SR, namely the DEL, WS, NF, FB, and SL functions, has its own variable and selectable capabilities. Thus the paths for the image stream through the logic of one PE must be the same "distance" or number of pel delays as for any other image stream through any other PE regardless of what local function is performed within the PE. This last statement must be qualified however by noting that occasionally the specific delay of a PE is purposefully set to shift an image spatially relative to another image or images within the system rather than to transform it. But discounting the translation delay, the path from the input to the PE 21 at line 27 to the output at line 28 must be the same number of pel times regardless of the computational function. This is not difficult; these delays must only be an integral number of pel times.

As examples, examine two paths for an image through a PE 21. Referring to FIG. 3, the first path is from input 27 along the path through SR 32.1 and other SRs 32, then via line 35 to DEL 36.1 and hence via line 35 to SRs 32.2 and 32.3 and thence along line 34 to WS 37 and line 38 to NF 33 and line 45 to SL 43, hence to line 28. For this path, the WS 37 is set to include SR 32.3 and NF 33 is set to perform the image identity function using SR 32.3 as the input. Also let the delay value of DEL 36.1 be set to the width (line row) of the image less the number of PEs in sequence between input 27 and input line 35 to DEL 36.1. Then:

OUTPUT pel(i) = INPUT pel(i)

This path has a delay T of exactly one column and one row to reach the input to SR 32.3. Because all PE operations are defined relative to a neighborhood around such a center pel, this one row one column delay or translation is nominally considered a portion of the constant delay of a PE. That is, such a path through the PE is considered to be without translation (and of course without transformation.)

This first path also has a fixed delay in addition to the (T = one row one column) delay for the image to reach SR 32.3. The fixed delay is a function of the implementation of the hardware, since WS, NF, and SL may each take its own constant (including 0) number of pel times to perform its respective function.

The second path is from input 27 through the SRs 32 and DELs 36.1 and 36.2 finally to SR 32.4, thence along line 39 to SL 43 and finally to output 28. This path also performs the identity operation, but with a different amount of translation or delay than the first path. SR 32.4 is chosen in advance so that with the proper selection of the amount of delay in the DELs 36 a desired amount of delay or translation can be obtained. It should be clear that one value of delay within the DELs would allow the first path and the second path to be equal; the value depends upon the fixed delays. The primary usefulness of this programmable large delay will be discussed further in connection with a network of PEs in FIG. 6.

Figure 4:
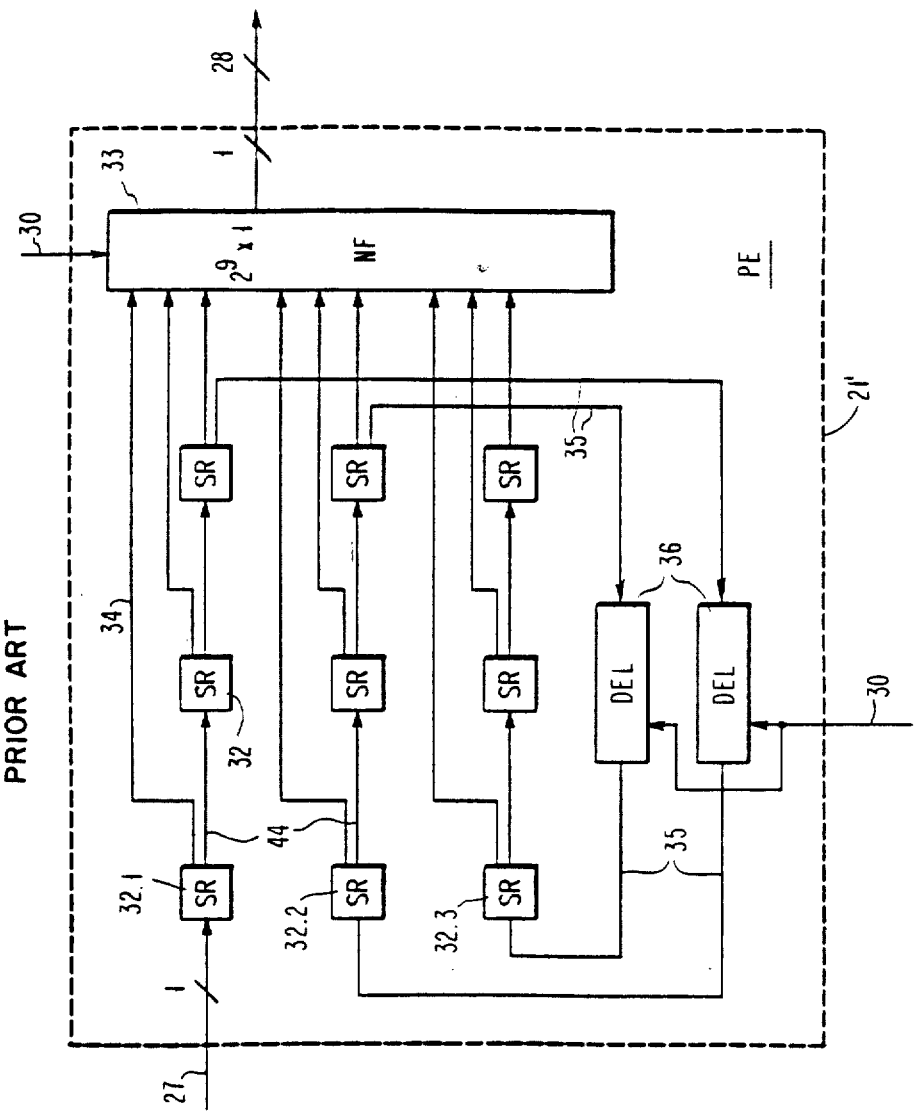

FIG. 4. Processing Element - A Standard 3×3 Image Window With Neighborhood Function Computation FIG. 4 is a detail of one type of Processing Element 21. This is the PE which is most common in the literature. Its processing power is boolean, not grey scale. A boolean, but not gray scale, version of this type of PE 21 can be implemented by the Extended Function PE discussed in connection with FIG. 3, by a particular set of configuration variables. It is most easily described as follows: The PE 21 is comprised of a number of Shift Register Bits 32, two DELs 36, and an NF 33. The remainder of the elements in FIG. 3, namely the WS 37, the FB 42, and the SL 43 can be thought of as omitted, or as replaced by wires, as the case may be. Nine SRs 32 are wired straight through to the NF 33, by line 34. These nine SRs 32 are spatially three consecutive SRs 32 from three consecutive rows of the input image. If the number of pel delays of the DELs 36 are chosen so that the total pel delays from SR 32.1 to SR 32.2 and from SR 32.2 to SR 32.3 are each equal to the width of the scanned image in pels, then the nine SRs 32 connected to the WF 33 over lines 34 are exactly three by three pels in a square array, the classical neighborhood.

It should be obvious to one skilled in the art that if all the elements of FIG. 3 are built in hardware, that the configuration of FIG. 4 can be obtained. This is done by configuring the elements WS 37, NF 33, FB 42 and SL 43 as follows: Set DELs 36 and WS 37 to select 9 SRs 32 on lines 34 from precisely the first three SRs 32 in each of the first three rows, and place their values on lines 38. Set NF 33 so that it computes logical functions of the R inputs from WS 37, making the values of the S inputs on lines 41 from FB 42 don't care. Then set the function of SL 43 so that the output 28 is selected from the input 45. In this way, simpler PE implementations, such as that of FIG. 4, are realized by the more universal PE implementation of FIG. 3.

Figure 5:
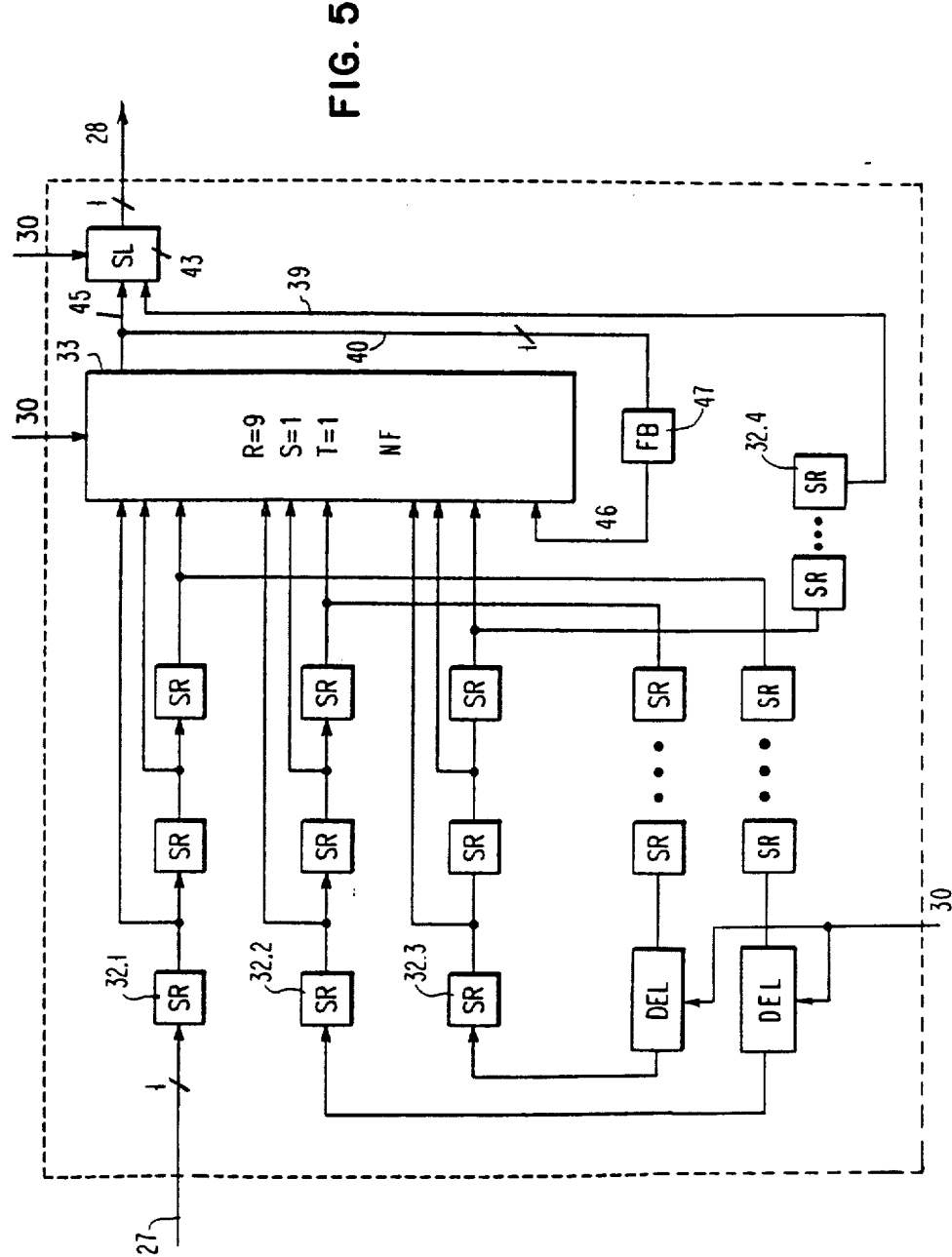

FIG. 5. The Processing Element—An Image Window with Neighborhood Function Computation and Feedback FIG. 5 is a detail of the preferred embodiment of Processing Element 21. A PE 21 could be implemented by the Extended Function PE discussed in connection with FIG. 3, by a particular set of configuration variables, as is shown in FIG. 4, or could be obtained by configuration of the hardware of FIG. 3, but would not be quite as effective in the system of the invention. The preferred PE 21 is comprised of twenty-four SRs 32, two DELs 36, a FB 47 of one bit, a NF with ten inputs (R=9 and S=1) and one output (T=1), and a SL 43. Nine SRs 32 are wired straight through along lines 34 to the NF 33. These nine SRs 32 are spatially three consecutive SRs 32 from three consecutive rows of the input image. As already stated, if the number of PEL delays of the DELs 36 are chosen so that the total PEL delays from SR 32a to SR 32b and from SR 32b to SR 32c are each equal to the width of the scanned image of PELs, then the nine SRs 32 connected to the WF 33 over lines 34 are exactly the three by three PELS in a square array. If the total delays of the DELs 36 are different from the width of the scanned image in PELs, then the PELs in the nine SRs 32 wired to NF 33 constitute a different neighborhood. One can consider this flexibility as equivalent to some restricted selection of the WS 37 function of FIG. 3 which is not included in the preferred embodiment. The remainder of the 24 SRs 32 are in series with DELs 36 and perform the same function of the DELs, namely providing delay, and also providing the specific SR 32.4 which is connected via line 39 to Sl 43. The choice of 24 SRs was dictated by the availability of 8 SRLs per DIP, and is not significant in the overall scheme.

The neighborhood function logic, NF 33, is equipped with a minimal version of the feedback mechanism 40–42 of FIG. 3. This minimal image function feedback mechanism 40, 46 and 47 feeds back to the neighborhood function logic a one-bit function of the output as an image description to be considered with the subsequent image. This minimal image function feedback mechanism, among other things, is useful in detecting gross changes in the presented stream of images, such as all white following any black, and thus has power greatly exceeding its cost.

Figure 6:
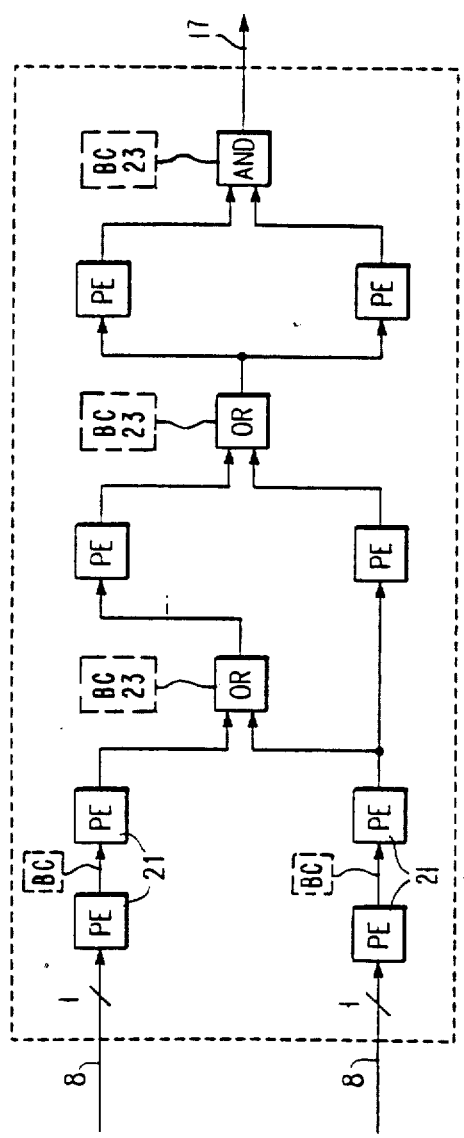

FIG. 6. A Network of PEs and BCs Configured from the Preferred Embodiment

FIG. 6 is a logical view of a portion of the CAGE hardware (box 3 FIG. 1) configured to use 8 PEs and the necessary BCs to implement the network of PEs in the logical combination shown. One will understand that this is a functional view of the hardware after a particular configuration or setup has been applied to some portion of one or more PEGs from FIG. 2. This is hardware of the PEGs as seen by the user, not the implementer. This figure shows eight PEs 21. It shows three logical functions OR-OR-AND which are in fact performed by configuring one or more BCs 23. If the eight PEs shown are all in the same PEG, then the three logical functions and all the interconnections between PEs 21, and interconnections between PEs 21 and logical functions, are performed by the one BC of that PEG. However, it is the purpose of the design to provide, irrespective of where within which PEGs the individual PEs are located, that the same logical connectedness shown in the figure can still be obtained by properly configuring the various elements of the PEGs in question.

It is not necessary at this time to consider the image processing function being done by the arrangement of PEs and BCs shown in FIG. 6. The purpose of this figure is to show the network configuring capability of the invention; this network is only illustrative of the types of networks attainable.

It is also instructive to note that there are three distinct functions being performed by the elements of the PEG. They are the following: The image transformation and/or translation function, as performed by the PEs 21. The logical bit by bit combinations of two or more image streams, typified by logical functions OR-OR-AND, as performed by the BCs 23. The third function, to provide the interconnections between PEs, is done by the combination (see FIG. 2) of the GL 22, the BD 24, the EB 9, the IS 25 and the BC 23 within one or more PEGs. Also a portion of the PE interconnection capability is provided by the cables implementing lines 17 (see FIG. 1) between various PEGs and between various CAGEs 3–6.

There are several ways in which the PEs 21 may be allocated within PEGs 10. The simplest case is where N is greater than or equal to 8 and where all eight PEs 21 in FIG. 6 are to be situated in the same PEG 10 of FIG. 2. For the network shown, no PE 21 outputs need to communicate to any BC 23 inputs except for the one BC which is in the same PEG. Thus, irrespective of which of the PEs may be attached to the EB9 (FIG. 1) through BD 24 (FIG. 2) and irrespective of which EB 9 signals are selected by IS 25 to the P inputs of the BC 23, the BC 23 will be configured to ignore all but eight of the N inputs from the PEs over lines 28. The connections between the inputs 17 to PEs 21 will be made by the selection capability of the GL 22. Similarly also, the other six PEs 21 will receive their inputs from the BCs 23 via GL 22. The six BC 23 outputs which go to the PE 21 inputs will be made over lines 29, where the one output from the BC 23 "AND" function will go to line 17 directly. Thus the sum total of the wires shown inside FIG. 6 and the logical functions combining PE outputs are all provided by the "programmably" reconfigurable hardware of the PEG.

It will also be clear to anyone skilled in the art that the eight PEs 21 of FIG. 6 can be arbitrarily assigned among the N PEs of the PEG.

Next is the case where the eight PEs of FIG. 6 are not all in the same PEG. This might occur for a number of reasons, the most obvious of which would be that a PEG had fewer PEs than required. A possible simple solution to the arises when the eight PEs can be replaced in two adjacent PEGs 10 When the paths 17 between PEGs will substitute for one of the paths provided by lines 29 within one PEG.

Another case could be that only a few PEs in each PEG remain after the rest of the network is assigned.

Another case (assuming that this diagram were only a portion of a larger network) could be that the connection requirements of a highly connected network would be greater than the number J of connections through EB 9 the PEs in this diagram to connect to other PEs in other PEGs. That is, the connections to the EB 9 through the BD 24 would not meet the complete requirements, and so some PEs would have to be located in other PEGs to avoid an EB bottleneck.

Another case (certainly not apparent from the sample network shown in this diagram) is that the logical function to be done between PEs at the BC 23 is a function of more than N+P image streams. In this case the final result must be built up in stages with the final level of the logic being performed in a second BC. This is a problem analogous to the fan-in problem of logic factoring when ANDs and ORs for a large number of signals must be built up out of circuits with few inputs.

In all of the aforementioned instances there is the requirement that at least one of the connections between two PEs 21 via a logic function or connection BC 23 will have to be made by a path to the EB 9 through BD 24 and back to a BC 23 of a second PEG via IS 25. This is no problem as long as allocation of a given image function (network of PEs) to a specific PEG does not exceed the total interconnection capability of the actual embodiment.

It will also be clear, after the function and implementation of the distributor (D) 11 is detailed, that the connection between PEs via BCs may also take place across CAGE boundaries. In this instance additional restrictions may apply, generally timing restrictions for maintaining synchronism through selective use of PEs as translation elements to match processing delays.

The usefulness of the large programmable delay available using the line 39 path of SL 43 in FIG. 3 can also be seen using FIG. 6 for illustration. The two PEs, for example, along the lower path from line 8, may be only delaying input line 8 to match the delay of the top two PEs along the upper path from line 8. In this case they perform only translation, and can be replaced by one PE with twice the delay of either, an ability provided by the programmable large delay.

THE PREFERRED EMBODIMENT—INTRODUCTION TO IMPLEMENTATION DETAILS

Figure 14A:
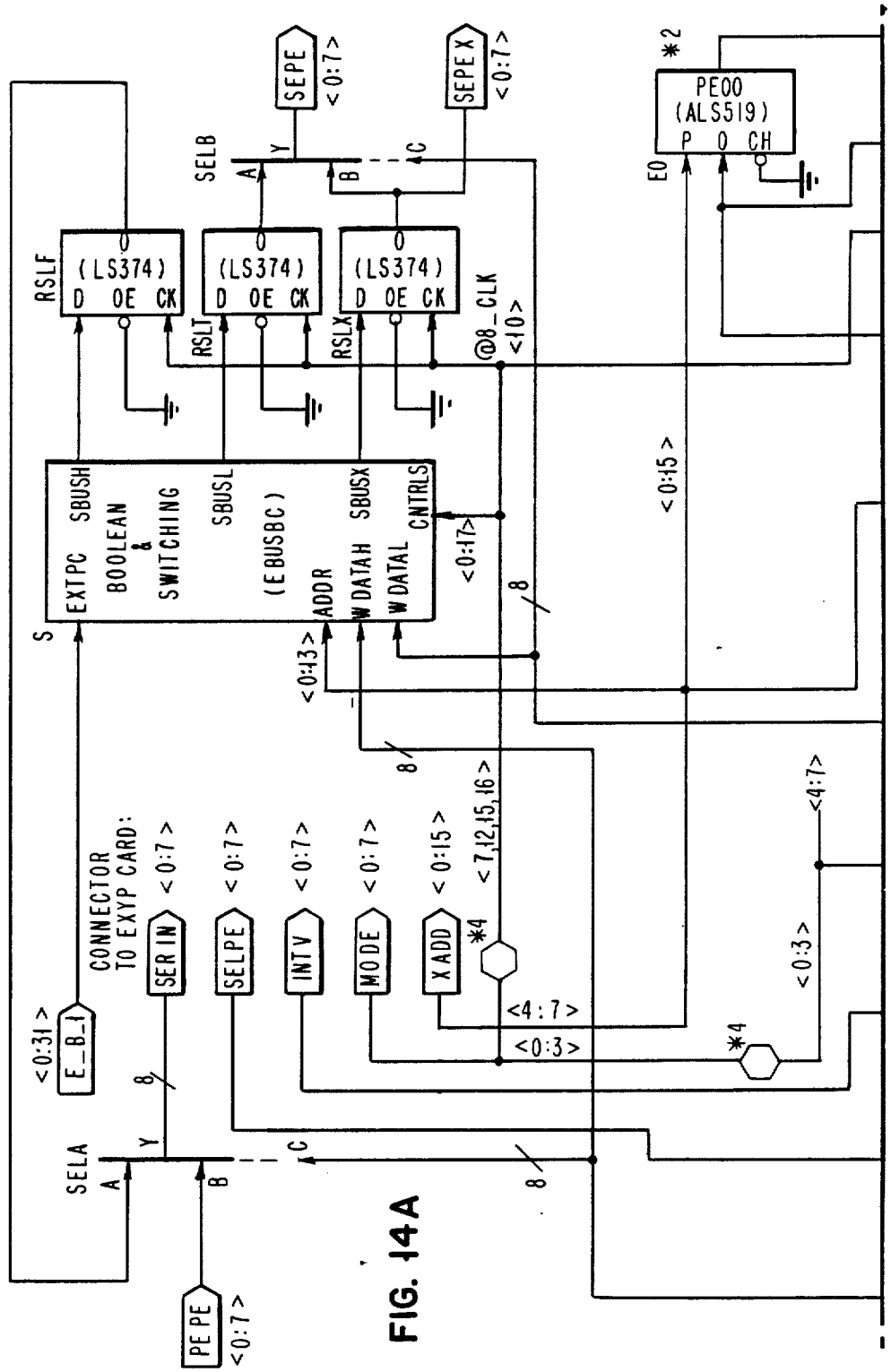
Figure 15A:
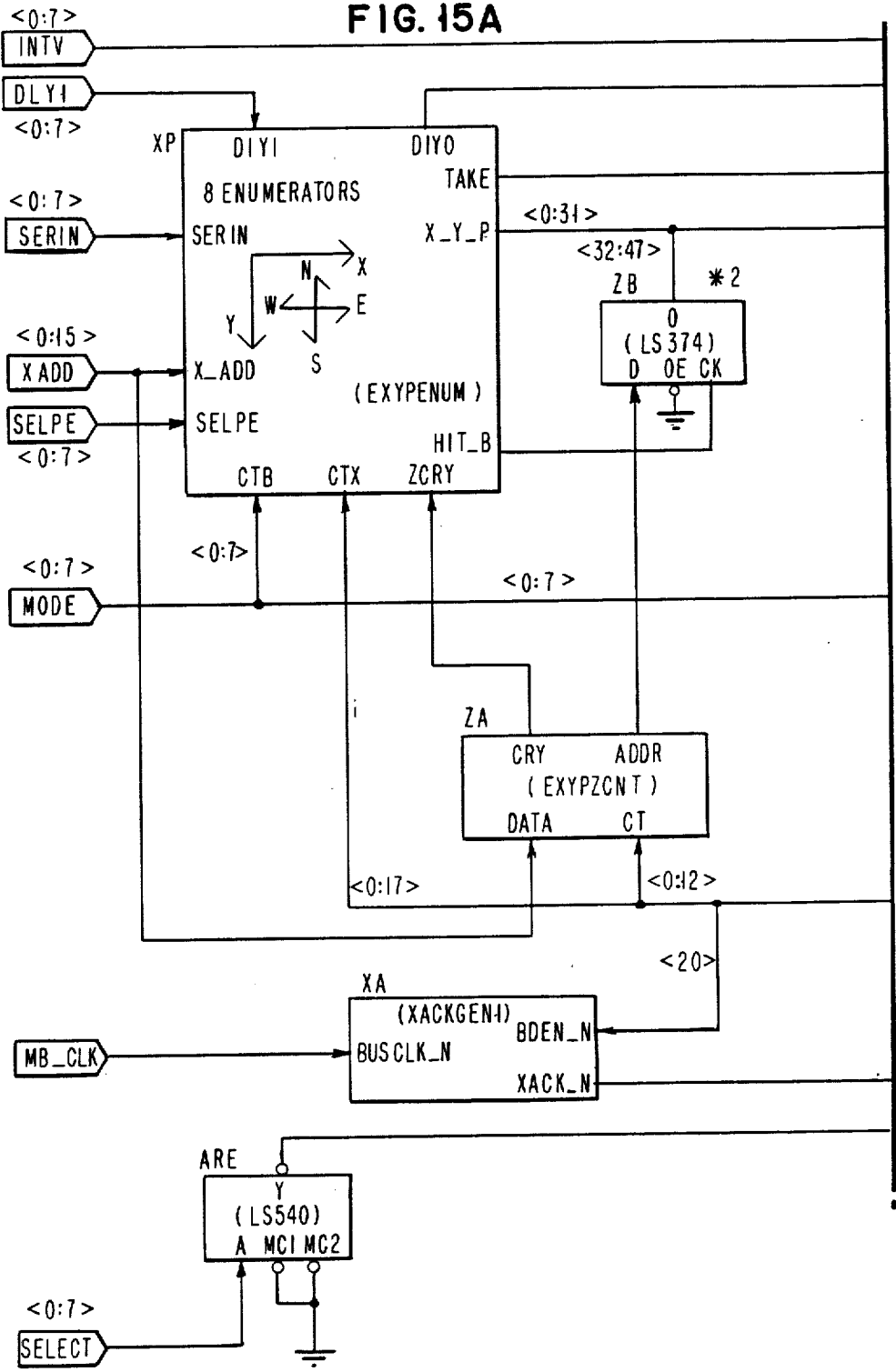
Figure 15B:
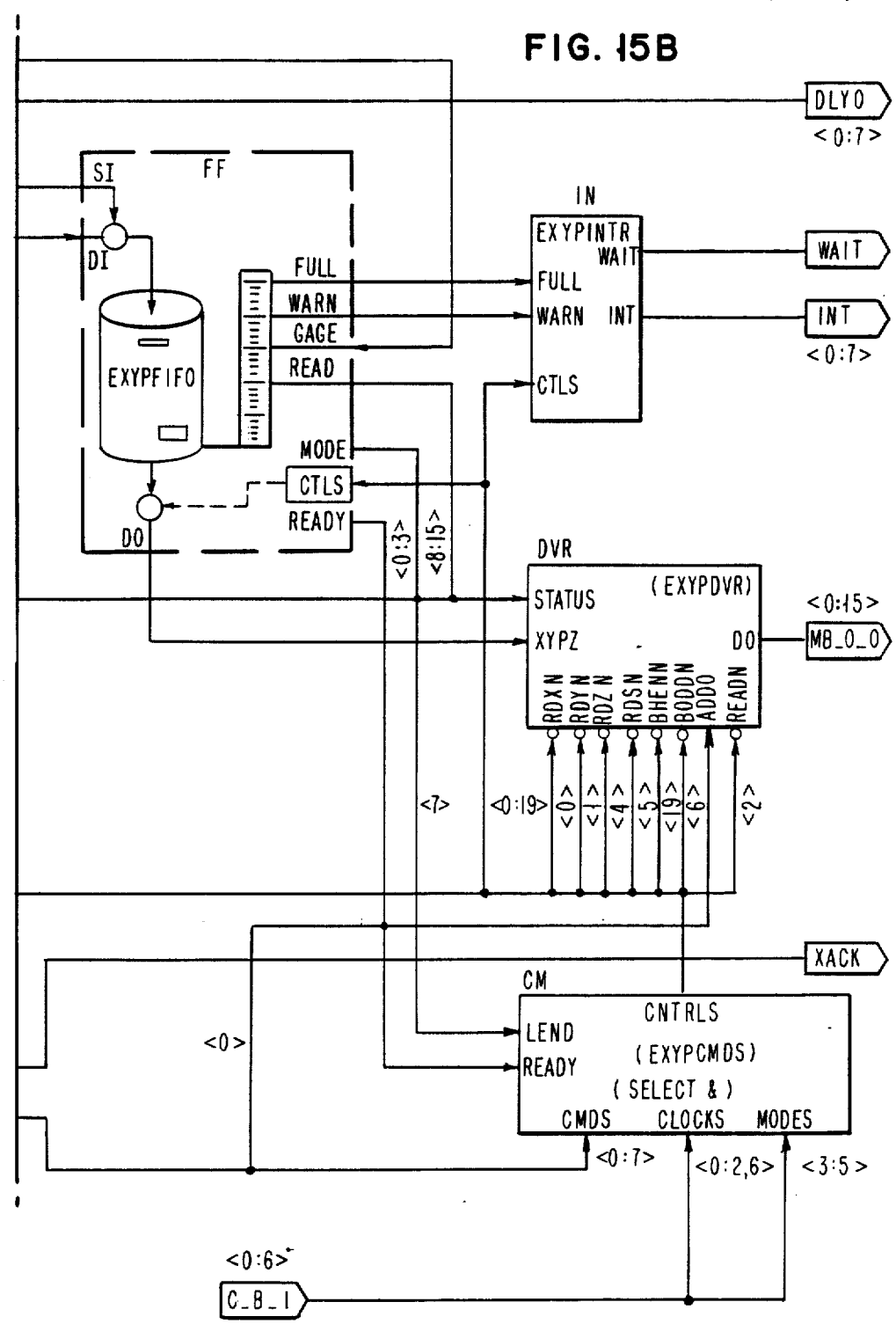

FIGS. 7–13 illustrate implementation details of the preferred embodiment of a PEG 10 (FIG. 1). FIG. 14 illustrate the bus distribution logic, Distributor (D) 11 (FIG. 1). FIG. 15 illustrate the enumeration logic, Enumerator E 12 (FIG. 1).

A choice of specific values is available in embodying the PEG. For clarity of explanation, the preferred embodiment of the PEG 10 has the specific values of TABLE 1 for its variable properties:

TABLE 1.

N = 8 Number of PEs per PEG
P = 4 Number of PE signals from the EBUS which enter the BC of a PEG.
J = 4 Number of PE signals, from each PEG, connected to the EBUS.
R = 9 Number of image pels (SR 32) in neighborhood function NF 33.
S = 1 Number of image streams fed back to NF 33 through FB register 42.
T = 10 T = R + S Total number of inputs to the NF 33.
M = 8 Number of PEGs per CAGE.

Figures—Style and Nomenclature

The pictorial nomenclature of FIGS. 7 through 15 is understood by those skilled in the art of digital design. They are hierarchical in nature. Multiple uses of the same portion of logic are not individually shown; the symbol *n replicates whatever it is attached to n times. Lines carry as many signals as their width or indices indicate. Names of lines (and possibly the indices) may change as signals pass from one level of the hierarchy to another. Comments will be made in the text from time to time to highlight specific features, but no attempt will be made in any place to describe all the features of the logic description convention which we have employed. For further detail the reader is referred to IBM Research Report RC 10491 "Basic Logic Editor (BLE)", April 9, 1984 by John Beetem for details of the graphical language employed by the DA system used to draw these FIGS.

In Basic Editor (BLE) diagrams, FIGS. include a very basic set of elements. There are input and output ports. There are lines. There are renumbering blocks. Finally, there are component symbols. Examples of each type occur in FIG. 7, and a brief discussion of the conventions applying to them follows:

First of all, input and output ports are pentagons, always in the form of an isosceles triangle with its base sitting on one side of a rectangle. Input ports always attach to a line at the intersection of the two visible sides of the triangle. Output ports connect to the signal line at the center of the side of the rectangle opposite the triangle. The name of the port is within the symbol. The indexing of the signals in the case of an input or output signal with multiple lines is always attached to the port symbol. See for example in FIG. 7 the input port PE-PE<0:7>, and the output port SEPE<0:7>, where <n:m> is a shorthand for n, n+1 . . . m−1, m.

There are two types of lines. Signal lines are solid, and if unidirectional have an arrow at the destinations. Signal lines can be indexed by attaching the symbol <i:j> directly to the portion of the line which is less than the full complement of indices. For example, line MBI_N<0:17> entering the PEG from the input port of the same name divides with three signals MBI_N<8:10> going to the ADDR port of FIG. 8. Signal lines may be named by text attached to the line as in FBACK, or unnamed. Signal lines also may be referred to by the name of the port to which the line is attached. The number of signals in a signal line can be represented by "/n" attached to the line. Dashed lines are used to highlight, as in the case where a dashed box 23 highlights the group of symbols making up the BC.

The renumbering block is a small hexagon with connecting two signal lines. The number of signals renumbered is shown by a *n attached to the block. N signals on one line are renumbered to n signals on the other line. For example the five signals from input port CBI_N<0:4> are renumbered to be the signals <20:24> of the signal line MBUS which goes to input CTLS on the boxes DEL 36. Such renumbering is usually done to join portions of signals together into a new signal as for example where the CBI_N signal and the MBI_N signal are joined into one line called BUS.

The component symbols of BLE are constructed according to the desire of the artist to take any shape and are either primitive or non-primitive in nature. Component symbols which do not have additional detail in BLE are called primitive elements. The box in FIG. 7 labeled DINH which is of logic type LS374 or the inverter I.1 in FIG. 8 are examples of such primitives. Other symbols which have additional BLE detail, i.e. for which another FIG exits, are called non-primitives. The box labeled FIG. 8 and the symbol labeled GL (dashed box 22) representing a multiplexed signal path are examples of these non-primitives. All component symbols have their input and output ports identified by attaching the port name to the location on the symbol outline where the signal line must be attached to connect to the internal figures. The reader is referred to the introduction to FIG. 8 for which an example explanation is given in detail. In this patent application, the details of some of these non-primitive figures are not supplied for the sake of simplicity. The difference between a primitive and a non-primitive FIG cannot be discerned by looking at the figure itself. A primitive is simply a figure for which the full BLE DA system needs no further description. Non-primitives in this specification are of two types:

(1) Those labeled FIGURE X, for which additional detail is supplied; and (2) Those not labeled with a figure number but only with a name. Where appropriate, a functional description is supplied in the text.

Primitives sometimes also have additional detail, but not in BLE form. Take box DINH, which the BLE drawing of FIG. 7 identifies as an LS374 Dual Inline Package (DIP). The operation of this LD DIP and of all LS blocks used in FIG. 7 and subsequent figures will be specifically detailed in publications such as "The TTL Data Book for Design Engineers" published by Texas Instruments, and which is universally understandable by persons skilled in the art. The BLE DA system itself does not need the detail supplied by "The TTL Data Book", and so the figure is designated a BLE primitive.

Figure 7A:
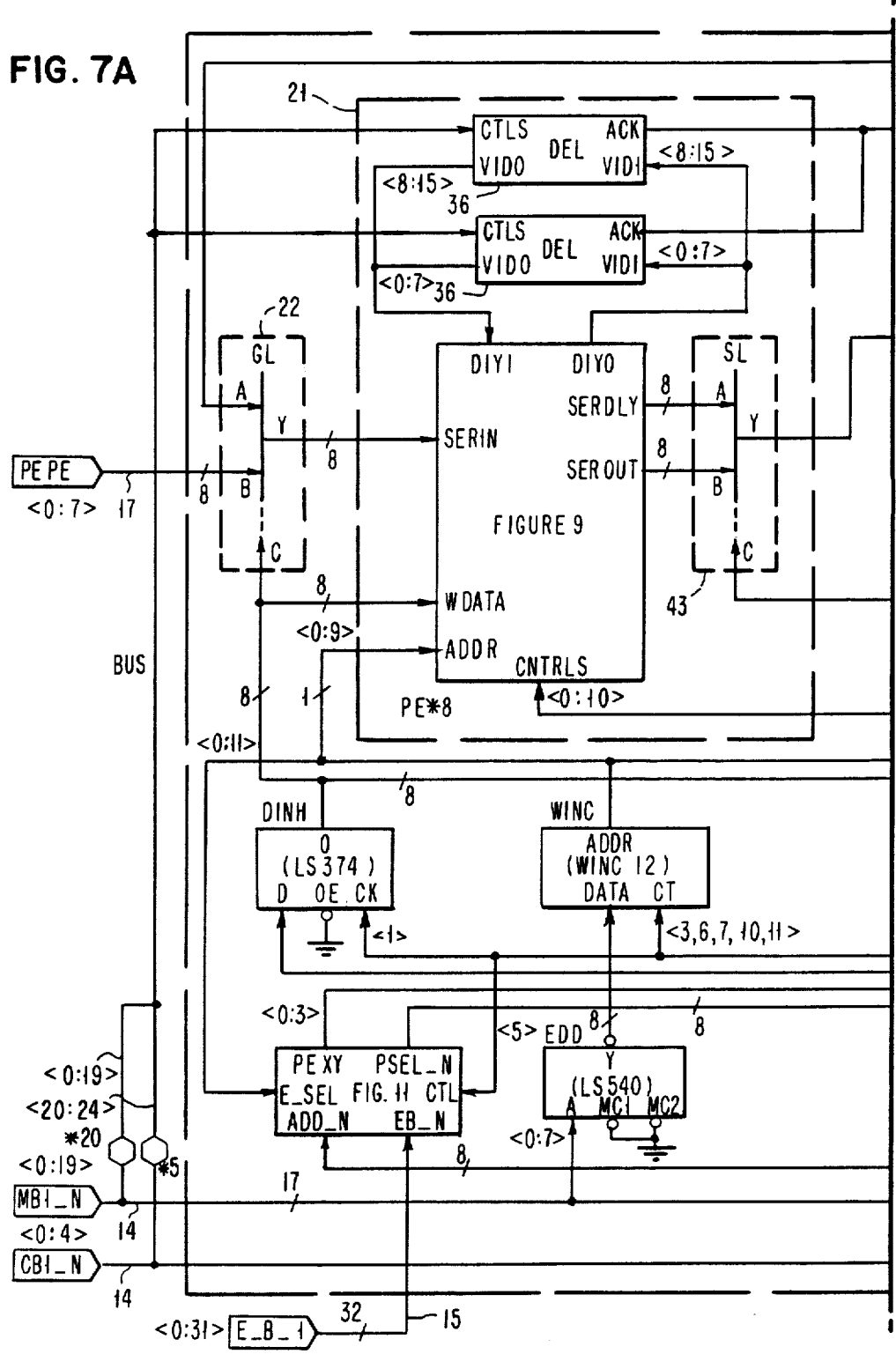
FIGS. 7-15 are detailed schematic diagrams of a preferred embodiment of the invention, showing system units, control logic and other electronics, presented as the best mode for implementing the invention.
Figure 7B:
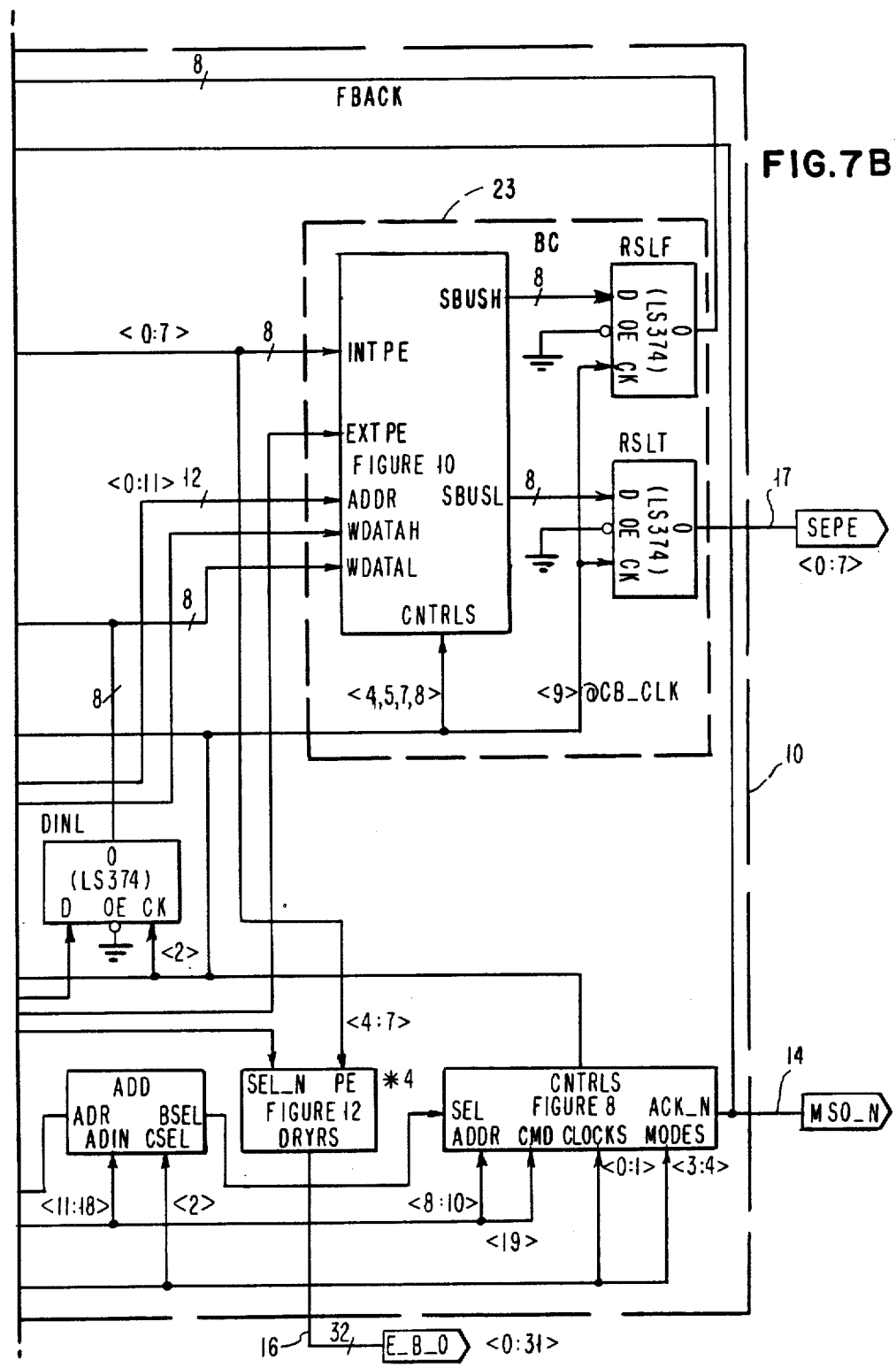
Figure 8:
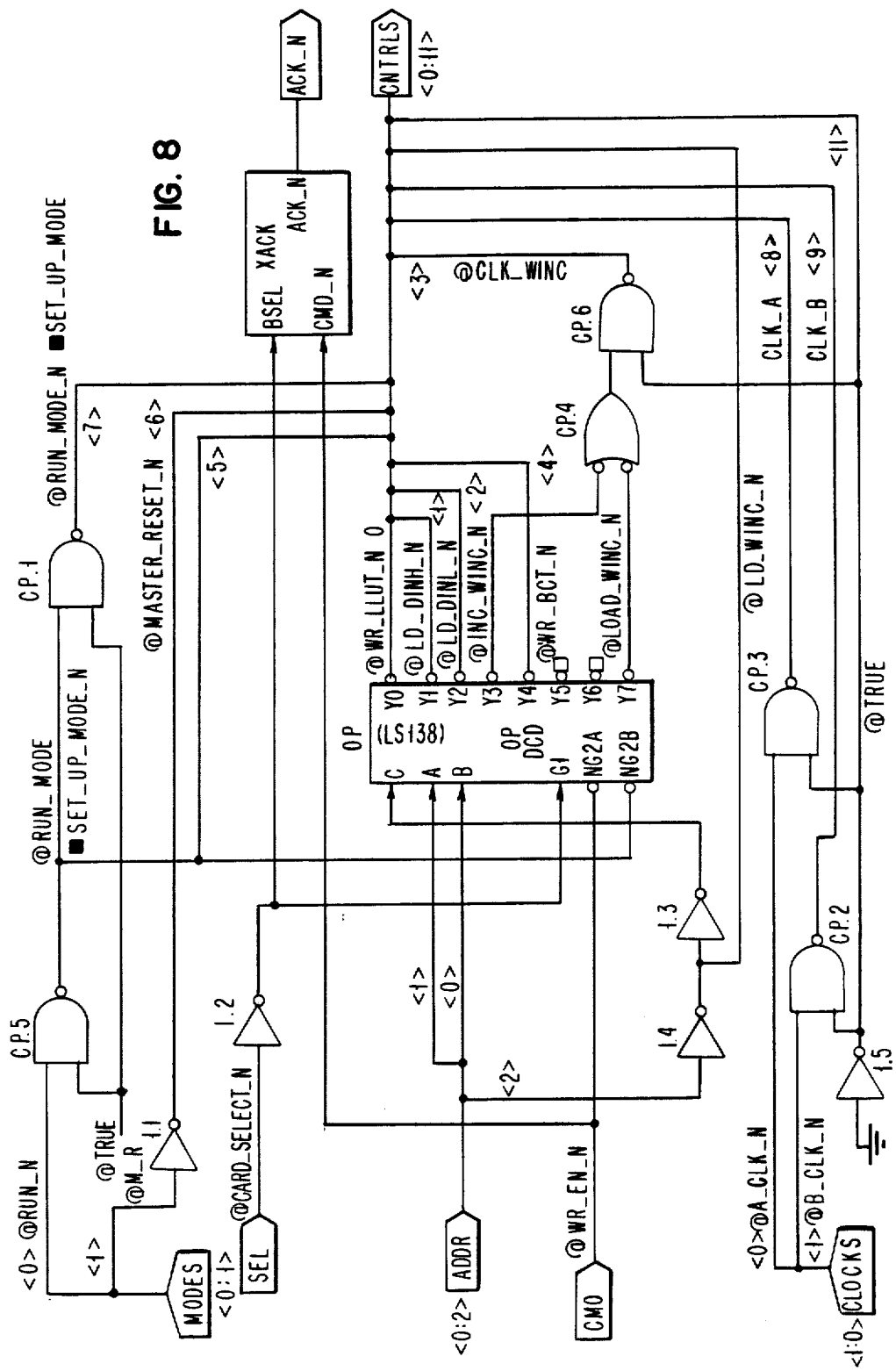

FIG. 7. Description of the PEG 10

FIG. 7 is the top level diagram of the preferred embodiment of a PEG 10.

Inputs and Outputs

The inputs to the PEG 10 are PEPE<0:7>, MBI_N<0:19>, CBI_N<0:4>, and E_B_I<0:31>. Inputs PEPE correspond to lines 17 in FIG. 1 and bring eight image stream values either from M 7 or the previous PEG 10 or from the D 11 in a previous CAGE 3/4/5. MBI_N correspond to a portion of the lines 14 in FIG. 1 and bring the control, data and address lines of the bus which are required to execute the commands used by the Host H 0 through Control Card CC 1 to configure the PEG 10 to one of its possible configurations. These MBI_N signals follow the Intel MULTI-BUS (TM) system bus specifications. These MBI_N signals are direct from the host H 0 but repowered by the CC 1 for each cage 3,4,5,6. The CBI_N<0:4> inputs are also part of the signal group 14 but are generated specifically by the CC 1 hardware, and one line is specific to an individual cage. These lines are control signals, mode signals and clocks which are active during run mode. The CBI_N lines are also distributed by the system bus repowering capability of the CC 1 hardware and RR 20, but are assigned positions on the P2 portion of the Bus rather than on connector P1 as are the MBI_N signals. The E_B_I<0:31> signals lines 15 are the Enumerator Bus positions. They are also distributed physically over a portion of th system bus P2 connector.

The outputs of the PEG 10 are SEPE<0:7>, MBO_N (a single line), and E_B_O<0:31>. The SEPE<0:7> signals are lines 17 which carry eight image streams from a PEG 10 to either the next PEG in sequence in a cage or to the Enumerator Bus Distribution facility D 11. The MBO_N signal carries the system bus command acknowledgement and is also part of the P1 signals of the System bus lines 14. The E_B_O<0:31> signals lines 16 are identical to the E_B_I signals, and make up the full complement of the EBUS signals EB 9. Lines 15 and 16 have been separated in the discussion only for clarity. The E_B_O signals are 32 of the 64 PE image streams which are generated within the eight PEGs 10 of a Cage and generated onto the EB 9 by the BD 24 logic (FIG. 2) portions of the PEGs 10 within each CAGE 3/4/5/6. The EBUS signals are also assigned to the P2 connector.

Figure 11:
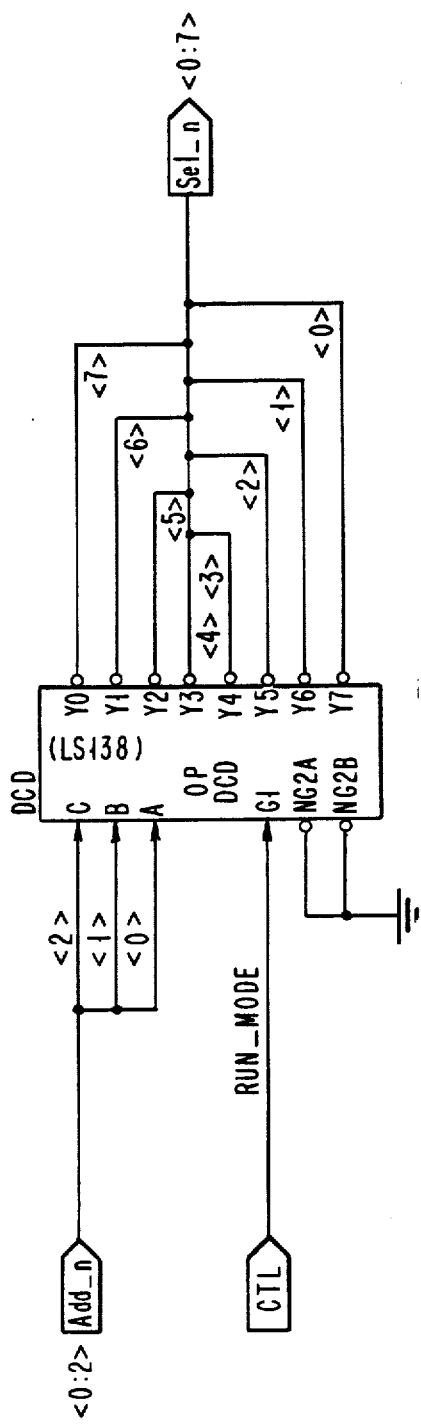
Figure 11:
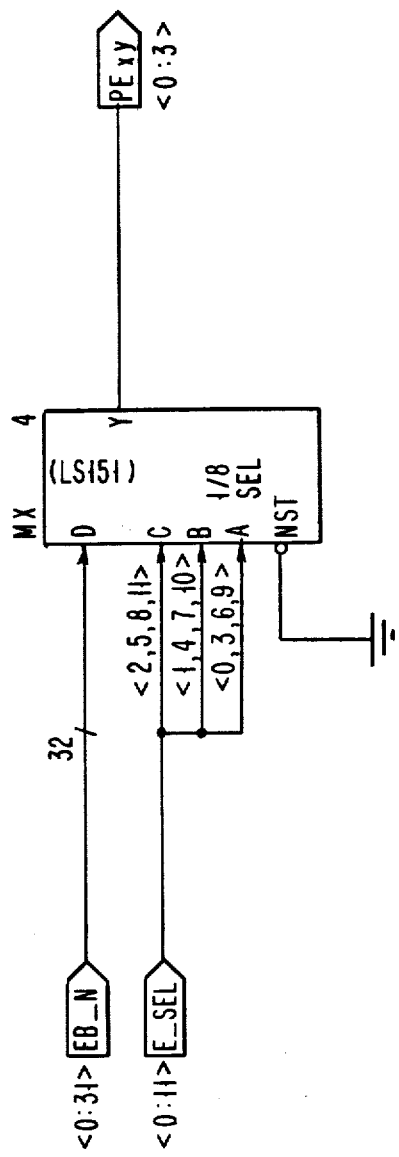
Figure 12:
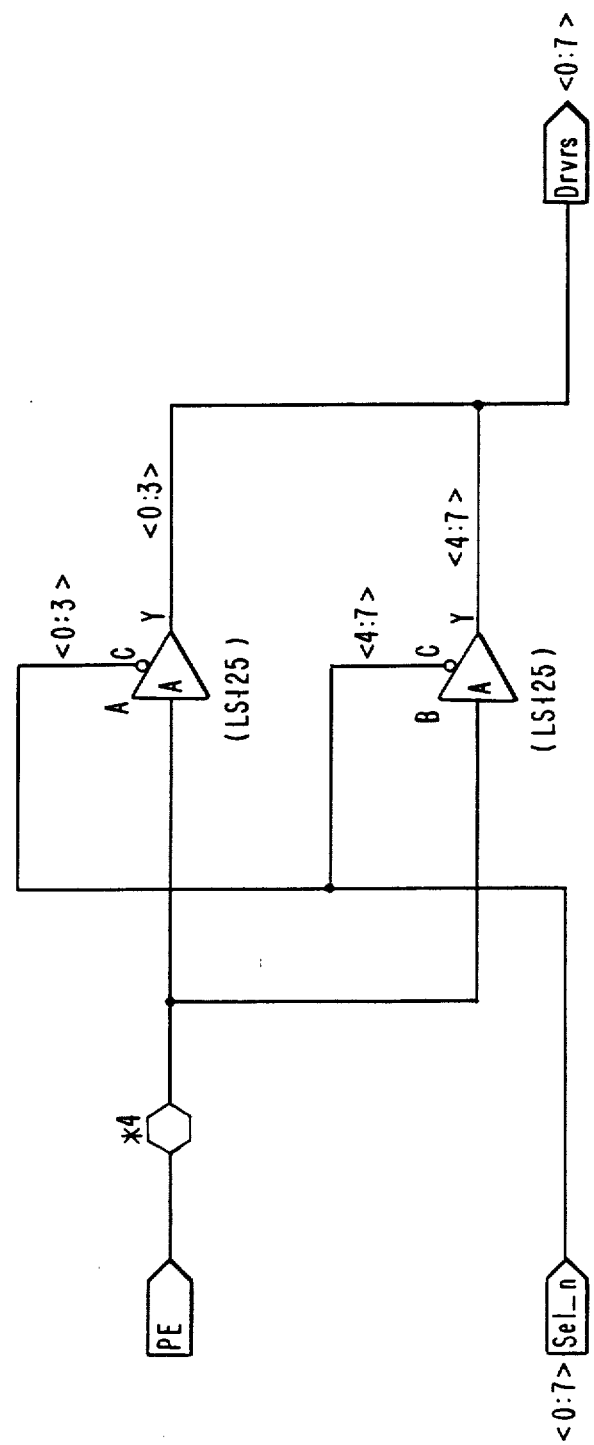

The correspondence between the various portions of the PEG 10 as the portions are shown in FIG. 7 and as they are shown in FIG. 2 is approximate. No exact correspondence can be made as some portions of logic function in more than one capacity and hence logically fall in more than one sub-portion of the PEG 10 as shown in FIG. 2. Box GL 22 is identical in both FIGS. Box 21 in FIG. 7 (everything inside the dotted line) more or less corresponds to 8 PEs 21 (FIG. 2) except that some parts of CT 26 are also embedded in the FIG. 7 representation. Box BC 23 (which in FIG. 7 is shown as the boxes FIG. 10 and RSLF and RSLT) is identical in both FIGURES except that some parts of the CT 26 are embedded in the FIG. 7 representation. FIG. 11 and FIG. 12 in FIG. 7 combined together correspond to the combination of boxes BD 24 and IS 25 in FIG. 2. Finally, the remaining portions, namely boxes DINH, WINC, DINL, EBD, ADD, and FIG. 8 constitute most of the Control Logic CT 26 while the rest of the CT 26 is buried within the other FIG boxes of FIG. 7. Detailed description of individual components and functional operation of the PEG will be keyed to FIG. 7.

The DINH is an 8 bit register (LS374) which functions as a holding register for data (outputs Q) on the way to the BC 23 (FIG. 10 input lines WDATAH) and to the PEs (FIG. 9 input lines WData) during configuration mode so the memories in these two functional portions can receive configuration data. During run mode the contents of DINH control on a bit by bit basis the eight paths in GL 22 over lines C.

The DINL is a 8 bit register (LS374) which functions as a holding register for data (outputs Q) on the way to the BC 23 (FIG. 10 input lines WDATAL) during configuration mode so the memories in this functional portion can receive configuration data. During run mode the contents of DINL control on a bit by bit basis the eight paths in SL 43 over lines C.

The WINC register is a 12 bit binary counter register (details of implementation not shown) which functions as a holding register for address data (outputs ADDR) during configuration mode. The address in WINC addresses the BC memory over lines ADDR of FIG. 10, and the PE memory (NF) over lines ADDR of FIG. 9 (lowest order 10 bits only) when the data in DINH and DINL is being written into those memories. During run mode the contents of WINC serve as four three bit registers which control through E_SEL inputs to FIG. 11 how the four (P) PEs in the PEG are selected from the EBUS.

The ADD box is a decoder. It contains a switch to physically determine the identity of this PEG within the CAGE, one of N. This three bit address or identify is communicated from ADD output ADR to input ADD_N of FIG. 11, where it is used to determine how the four (J) PEs of this PEG are connected to the EBUS. The ADD box also decodes address bits from the IEEE 796 bus received on inputs ADIN. If the switch setting matches the address bits on ADIN, and additional address bits match the PEG code for the instructions pertinent to the PEG (excepting the DEL portions), and the cage select signal from the CC 1 on input CSEL is active, then ADD sends a selection signal to the controls in FIG. 8 to activate them. This only occurs during configuration mode when registers or functions within the PEG are being addressed. The selection signal goes from line ADD output BSEL to FIG. 8 input SEL. EBD is an eight bit inverting buffer (LS540) which inverts the eight data bits of the System bus and repowers them for distribution to the various registers within the PEG (DINH, DINL, and WINC).

Figure 9:
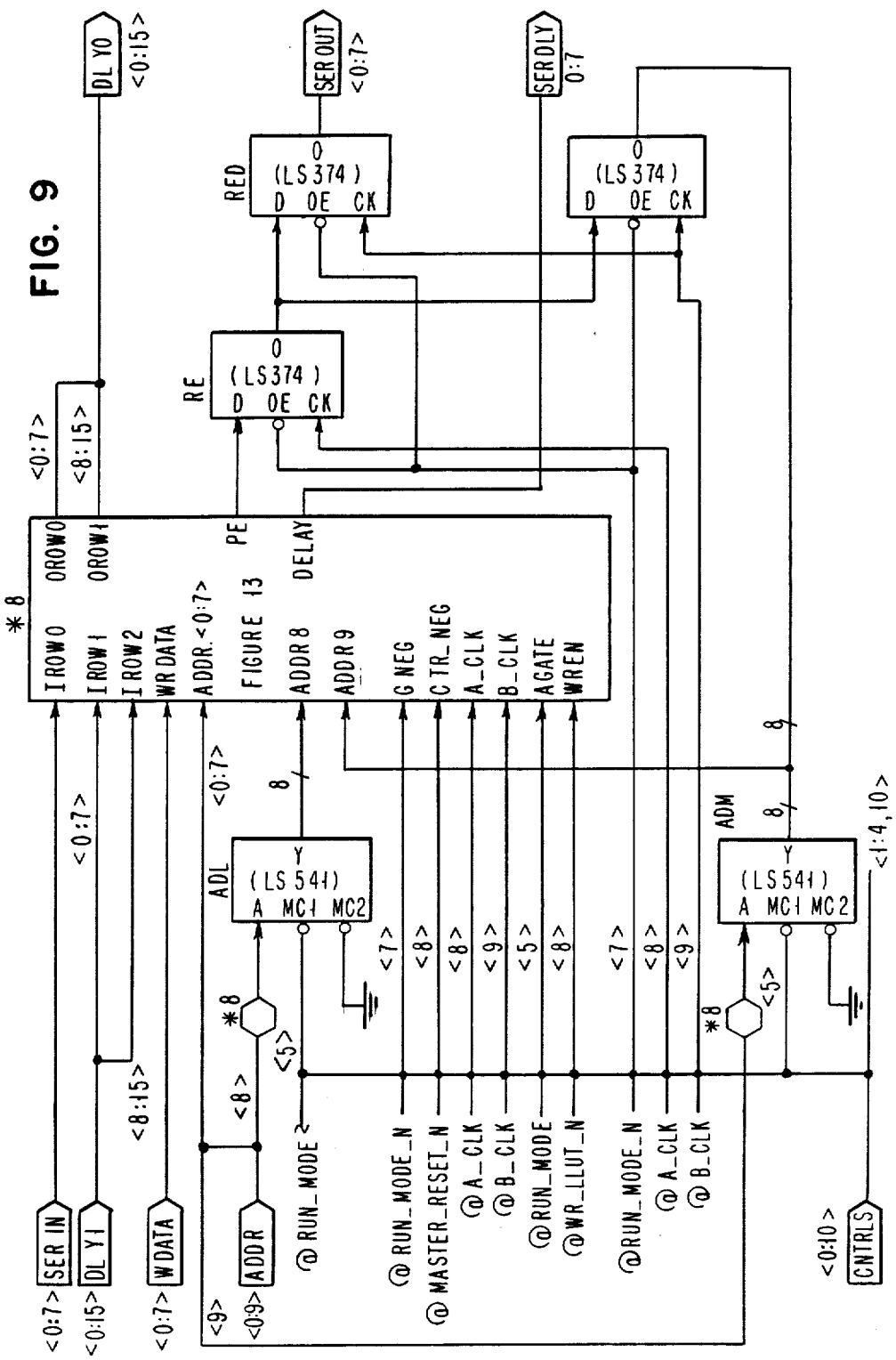
Figure 10:
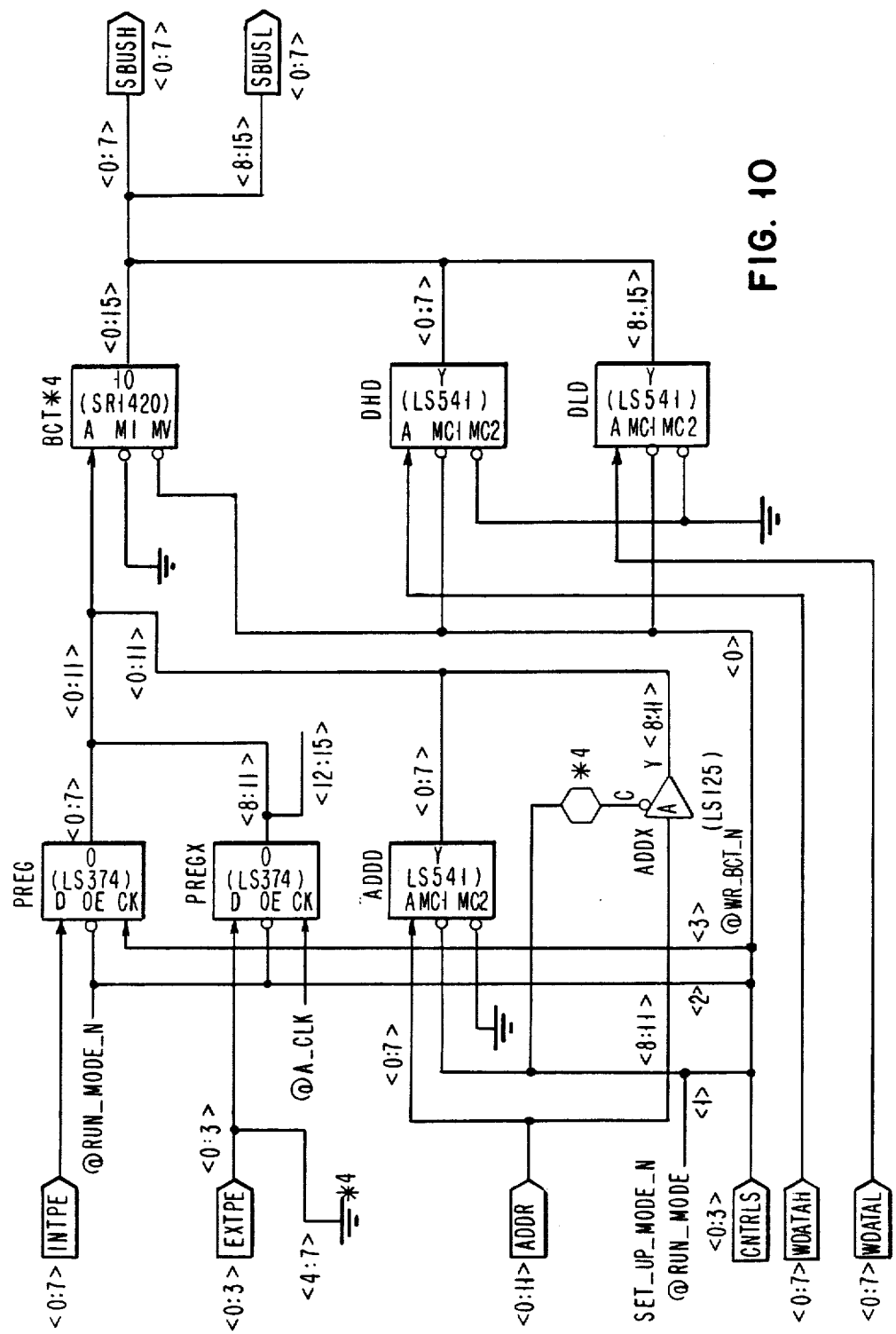

The RSLF is an 8 bit register (LS374) which functions as a holding register for eight of the BC results which come from FIG. 10 outputs SBUSH to RSLF inputs D at b_CLK time on input CK. The purpose of this register is to balance the timing as image data (Outputs Q) moves from the BC to the PE via inputs A on GL 22 and hence to Ser_In of FIG. 9. This occurs during run mode. The register has no function during configuration mode.

The RSLT is an 8 bit register (LS374) which functions as a holding register for eight of the BC results, which come from FIG. 10 outputs SBUSL to RSLT inputs D at B_CLK time on input CK. The purpose of this register is to balance the timing as image data (Outputs Q) moves from the BC to the PEs of the next physical entity in the configuration (either another PEG 10 or box D 11) in either case over lines 17 SEPE. This occurs during run mode. The RSLT Register has no function during configuration mode.

The GL 22 is eight two way multiplexors, implementation not shown, each one of which selects signal A from the RSLF register or signal B from the RSLT register in a previous PEG, over line 17 PEPE, according to the control value in the corresponding bit of register DINH over line C.

The SL 43 is eight two way multiplexors, implementation not shown, each one of which selects signal A from the SER_DLY output of FIG. 9 or signal B from from the SER_OUT output of FIG. 9 according to the control value in the corresponding bit of register DINL over line C.

The delay functions DEL 36 delay the image data input streams a selectable amount. The use and implementation of these delays is either to form a specific window for the NF function or to maintain image synchronism between PEs widely, separated in the network, whose images must be joined. Inputs CTLS and output ACK provide the DEL hardware with the system bus signals to function (in a manner to be described in connection with FIG. 8) to receive data over the system bus for configuring the amount of image delay. All in all, eight counts will be sent to each DEL during configuration mode. Each count respectively contains the amount of delay which will be introduced between the eight video inputs VIDI which come from the shift register SR elements over outputs DLY0 of FIG. 9, and the eight video outputs VIDO, which will then go back to the shift register elements over lines DLYI of FIG. 9.

The function of the remainder of the boxes in FIG. 7, marked FIGS. 8, 9, 10, 11 and 12, will be discussed with those figures. These functions include the CTL, PE, BC, IS and BD functions respectively. Additional detail of FIG. 7 will be presented in connection with the same figures.

FIG. 8. Description of a Portion of the Control Logic CTL 26

The function of the logic shown in this FIG is to decode the multibus commands when in SET_UP mode, and to repower the clocks used in RUN mode. Refer to FIG. 7 which is the top level diagram of the preferred embodiment of a PEG 10. There you will see that the box labeled FIG. 8 has a number of input lines distinguished by the arrows, labeled counter-clockwise beginning on the left as SEL, ADDR, CMD, CLOCKS, and MODES. Continuing counter-clockwise the outputs without arrows are labeled ACK_N and CNTRLS. Each line name stands for a single signal or a group of signals which all have the same name but with an index. We will find the same signal names on the ports of FIG. 8 but not necessarily in the same spatial orientation. This same signal cross-referencing conventions is followed whenever a FIG includes another FIG. One should note for instance that each FIG may rename and reindex the signal names. For instance, following inputs MBI_N<0:19> of FIG. 7 we see that it is a sub-group of these signals MBI_N<8:10> which connect to the ADDR inputs of the box labeled FIG. 8. These same ADDR lines in FIG. 8 are labeled ADDR<0:2>, the conventional always that the indices are matched in ascending order. Thus MBI_N<8> matches ADDR<0>.

Inputs and Outputs

Referring to FIG. 7, the inputs to FIG. 8 are the following: SEL which comes from output BSEL of box ADD. ADDR<0:2> and CMD which come respectively from the inputs MBI_N<8:10> and MBI_N<19>. CLOCKS<0:1> and MODES<0:1> come respectively from inputs CBI_N<0:1> and CBI_N<3:4> Thus, SEL is generated internal to the PEG 10. ADDR and CMD are multibus signals on the P1 connector, and CLOCKS and MODES are P2 connector signals generated by the CC 1 logic.

The outputs of FIG. 8 are ACK_N a single line and CNTRLS<0:11>. ACK_N goes directly from FIG. 8 to the output MBO_N of FIG. 7. CNTRLS on the other hand is distributed to a very large number of places in FIG. 7 and to portions within other figures. These CNTRLS signals are the clocks, modes, and command lines which control the flow of information within the PEG 10.

The Various Portions of FIG. 8 and Their Function

The inverters I.1, I.2, I.3, I.4 and I.5, and the 2-way NANDs CP.1, CP.2, CP.3, CP.5, and CP.6, which each have one input connected directly to an always true (up) signal coming from the output of I.5, all functions as re-powering inverters to isolate and invert the multibus signals P1 and P2.

At this level of the BLE drawings, the specific electrical type of inverter or NAND is not specified, and is not important or necessary to the understanding of the patent.

The OP block, type LS138, is the operation code decoder. It turns exactly 1 of 8 possible conditions in the command field (lines ADDR <0:2>) into one active command on the outputs Y0 . . . Y7 whenever there is a negative pulse on CMD (local name WR_EN_N) and the system is in SETUP MODE (CP.5 output negative) and the PEG is selected (I.2 output up). The six used instructions or command signals Y0 . . . Y4 and Y7 go to individual bits within the output CNTRLS<0:11> as shown by the <n> attached to each line, except that Y3 (INC_WINC_N) and Y7 (LOAD_WINC_N) are ORed together by the two-way minus level NOR CP.4 to produce a single line on the output of CP.6 called CLK_WINC<3> which is used to clock the WINC counter (FIG. 7) either on loading or incrementing.

TABLE 2 is a tabulation of all commands in the PEG. Those applicable to FIG. 7 (exclusive of DEL) are in the EPE register select group. Note that the address decode and Controls section of the DEL boxes (FIG. 7) will be similar in structure to what we have just shown for the portion of the PEG not in the DEL boxes. The commands applicable to the DELs are in the DEL Register select group. Note also that the signals MBL_N<N>ETC. do not necessarily correspond bit by bit to the BA<23:0> etc. numbering of the system bus in TABLE 2, since many suitable instruction code assignments can be made as is known in the art.

The last block in FIG. 8 is the XACK block, which when BSEL is active (i.e., when this PEG is selected) will turn the CMD line from the Host back to the Host as a command acknowledge (output ACK_N). The details of XACK are not shown, as they can be easily designed by anyone skilled in the art.

FIG. 7-13 Description of the PEG 10 Operation in Configuration Mode

The operation of the PEG 10 during configuration mode (SET_UP mode) will be described using FIGS. 7-8. The Control Logic CTL 26 (FIG. 2), shown in greater detail in FIG. 8 and portions of FIG. 7, is used in conjunction with host computer H(0,FIG. 1) to load the registers and memories in the PEGs. First described is how one system bus command from H is recognized and executed by CTL 26 during the setup mode. Then the system bus commands applicable to the PEG 10 are listed and their functions discussed. Finally, a brief description of how all the commands are used to configure a PEG will be given.

Register DINH, which the BLE drawing of FIG. 7 identifies as an LS374, is specifically detailed in publications such as "The TTL Data Book for Design Engineers" published by Texas Instruments, and is universally understandable by persons skilled in the art. The LS374 is an eight bit register, which receives eight bits of data on lines D from the LS540 labeled EBD, which isolates and inverts eight data out lines of the multiple bus. The DINH register is set to the value of the system bus data lines upon the rise of the clock port of the register DINH. In so far as praticable, the names used for signal input/output lines at a logic element correspond to the pin names listed in the above referenced TTL Data Book when the logic element represents a complete DIP. Sometimes pin (signal) names are shortened to fit the picture better, sometimes altered slightly to fit the demands of the DA graphics system (as for example to avoid signal names which begin with an alphabetic character). For some DIPs, of which the LS 374 is an example, a single input or output line will really represent a group of lines. Hence the D input of the LS374 package used for DINH is really D1,D2,D3,D4 ..., D8. This information is available to the designer through a supplementary diagram for each DIP package type which diagrams are not included in the patent description, but whose pertinent contents may be easily and correctly inferred by anyone skilled in the art by cross-referencing the TTL Data Book diagram and the DIP outline used in this description.

The multibus command which will be issued by the computer (micro-processor) in the Host H 0 which alters the contents of the DINH register is called LOAD DINH. The operation of the LOAD DINH command is as follows: First the Host H 0 puts the address of the desired CAGE and PEG 10, and the byte of data to be written into register DINH onto the applicable bits of the multiple bus. The Host then asserts the WRT command on another line of the multiple bus. The CC 1 logic decodes the specific cage address and activates the appropriate cage select line to the cage being addressed. This is the line labeled CBI_N<2>. When the PEG logic in boxes ADD and FIG. 8 recognize the address on the bus as their own, they will signal the Host H 0 over the system bus via line MBO_N (the XFER acknowledge) line. When the Host H 0 sees the XFER Acknowledge line activated, it can deactivate the WRT command. It is on this deactivation, that the PEG control logic in FIG. 8 reflects to the DINH register a rising signal over line 1 of the FIG. 8 controls, which rising signal clocks the data byte on the system bus (as regenerated and inverted by the EBD logic) into register DINH. The inversion is necessary only to compensate for the fact that the usual active level of signals on the system bus is negative rather than positive. We will describe the specific operation of blocks ADD and FIG. 8 to properly decode the system bus WRT command and properly generate the acknowledge signal on MBO_N later. The substance of the operation of the logic should be easily understood by anyone skilled in the state of the art by reading this description and reading the system bus Specification referenced earlier. One skilled in the state of the art will recognize that a number of variations in the choice and implementation of commands is very feasible, and since this is not the substance of the invention these variations will not be described further. Suffice it to say that the LOAD DINH command results in a byte of data being transferred by the Host to register DINH of the addressed PEG of the addressed CAGE. A similar discussion could also describe an analogous command implemented over a VERSA-BUS (TM) system bus or any bus convention. The choice of the system bus is not pertinent to the realization of the preferred embodiment, and there is no property of that bus other than its ability to transfer to (or from -for functions not within the PEG) any distinct register. The reason that the specific timing characteristics of the bus is not crucial to correct functioning is that these type of Bus operations occur during set-up time, not during run time when images are actually being processed. Hence these BUS commands or instructions can be done at the timing leisure of the particular processor within the Host and the particular bus structure chosen by the implementer.

TABLE 2 lists the complete set of system bus commands as they apply to various portions of the system within the CAGEs, i.e. within the PEG, D, and E portions.

TABLE 2
---
System bus Address: BA<23:0>
System bus Data:BD<15:0> OR BD<d,c,b,a>Hex
MITE Base Address BA<23:15>
Cage Select BA<14:13>
Board Select within a Cage BA<10:8> PEG Address
Board Type BA<12:11> PEG=00 DEL=01 EXIT=10 SPARE=11
Register Select BA<7:0>
DEL Register Select (Commands)
  Decodes BA<4,3,2,1,0>
    Note that these commands are only active in SET_UP mode.

TABLE 2-continued

See CNTRL board commands for entering SET_UP.
1 - - - - Load Address counter N
0 - - - - Address Address counter N
- 4 2 1 - Nth PE address
- - - - - Low byte of Address N
- - - - 1 High byte of Address N
PEG Register Select (Commands)
  Decodes BA<2,1,0>
    Ignores BHEN (Byte High Enable), 1 byte data bus.
    Note that these commands are only active in SET_UP mode.
    See CNTRL board commands for entering SET_UP.
0 0 0  Load WINC WINC<x,y,z>←BD<b,a>,0 HEX
0 0 1  Undefined (no operation)
0 1 0  Undefined
0 1 1  Write BC Memory BC<WINC;d,c,b,a>←DINH<b,a>,DINL<b,a>
1 0 0  Increment WINC<11:0>by 1
1 0 1  Load DINL DINL<b,a>←BD<b,a>
1 1 0  Load DINH DINH<b,a>←BC<b,a>
1 1 1  Write NF Memory LT<WINC<9:0>;b,a>←DINH<b,a>
    Note that for initialization purposes LT should be considered as a 1K × 8 bit
    memory. LT<A;N> contains the personalization for PE<PEG,N>
EXIT (Commands)
  Group select
  Decodes BA<6,5,4,3>
- - - 1  Selects D 11 card of EXIT logic, WRITE commands.
- - 1 -  Selects D 11 card of EXIT logic, MISC commands.
- 1 - -  Selects E 12 card of EXIT logic, READ commands.
1 - - -  Selects E12 card of EXIT logic, MISC commands.
D 11 WRITE Group select (active when BA<3>is true)
  Decodes BA<2,1,0>in conjunction with BHEN (Byte High Enable)
  Note that these commands are only active SET_UP mode.
  See CNTRL board commands for entering SET_UP
0 0 0  ~BHEN Load MODL MOD<x,w>←BD<b,a> HEX
0 0 1  ~BHEN Load MODH MOD<z,y>←BD<b,a> HEX
0 0 0  BHEN Load MODL and MODH MOD<z,y,x,w>←BD<d,c,b,a> HE
  Note: MOD defines line width 10 thru (2*16)-1
  if MOD=x'FFFF' then Y or Z is just high order X
0 1 0  ~BHEN Load INTV INTV<b,a>←BD<b,a> HEX
0 1 1  ~BHEN Load MODE MODE<b,a>←BD<b,a> HEX
Usage of MODE register bits:
  Bit 0: (0/1) Z Hardware(Not Installed/Installed)
  Bit 1: (0/1) Three byte data/Two byte data
  Bit 2: (0/1) Y is 0-256/Y is Delta Y since last hit
  Bit 3: (0/1) Spare
0 1 0    BHEN Load INTV and MODE INTV<b,a>←BD<b,a>
      and MODE<b,a>←BD<d,c>
1 0 0  ~BHEN Load DINL DIN<x,w>←BD<b,a> HEX
1 0 1  ~BHEN Load DINH DIN<z,y>←BD<b,a> HEX
1 0 0    BHEN Load DIN DIN<z,y,x,w>←BD<d,c,b,a> HEX
1 1 0  ~BHEN Load XAL XCNT<x,w>←BD<b,a> HEX
1 1 1  ~BHEN Load XAH XCNT<z,y>←BD<b,a> HEX
1 1 0    BHEN Load XA XA<z,y,x,w>←BD<d,c,b,a> HEX
D 11 MISC Group select (active when BA<4>is true)
  Decodes BA<2,1,0>
  Ignores BHEN (Byte High Enable).
  Commands (except LD TAKE) are only active in SET_UP
  mode. See CNTRL board commands for entering SET_UP.
0 0 0  Load TAKE TAKE<a,b>←BD<b,a>HEX
    Active in either SET_UP or RUN mode.
0 0 1  Undefined (no operation)
0 1 0  Write BC Memory BC<XCNT;d,c,b,a>←DINH<b,a>,DINL<b,a>
0 1 1  Undefined (no operation)
1 0 0  Write BCX Memory BCX<XCNT;b,a>←DINH<b,a>
1 0 1  Undefined (no operation)
1 1 0  Increment XCNT<15:0>by 1
1 1 1  Undefined (no operation)
E 12 READ Group select (active when BA<5>is true)
  Decodes BA<2,1,0>in conjunction with BHEN (Byte High Enable)
  Note that these commands are only active in RUN mode.
  See CNTRL board commands for entering RUN
0 0 0  ~BHEN Read XAL BD<b,a>←FIFO<xlb,xla> HEX
0 0 1  ~BHEN Read XAH BD<b,a>←FIFO<xhb,xha> HEX
0 0 0    BHEN Read XA BD<d,c,b,a>←FIFO<xhb,xha,xlb,xla> HEX
0 1 0  ~BHEN Read ZAL BD<b,a>←FIFO<zlb,zla> HEX
0 1 1  ~BHEN Read ZAH BD<b,a>←FIFO<zhb,zha> HEX
0 1 0    BHEN Read ZA BD<d,c,b,a>←FIFO<zhb,zha,zlb,zla>
1 0 0  ~BHEN Read P BD<b,a>←FIFO<b,a> HEX
1 0 1  ~BHEN Read YA BD<b,a>←FIFO<b,a> HEX
1 0 0    BHEN Read YP BD<d,c,b,a>←FIFO<yb,ya,pb,pa> HEX
1 1 0  ~BHEN Read MASK BD<b,a>←MASK<b,a> HEX
1 1 1  ~BHEN Read FCNT BD<b,a>←FCNT<b,a> HEX
1 1 0    BHEN Read FCNT and MASK

TABLE 2-continued

BD<z,y,x,w>←FCNT<b,a>,MASK<b,a> HEX
Note: FCNT is the # of (XYP) events in Fifo
E 12 MISC Group select (active when BA<6>is true)
 Decodes BA<2,1,0>(ignores BHEN (Byte High Enable))
0 0 0  Deactivate Interrupt
0 0 1  Undefined (no operation)
0 1 0  Copy XA to ZA
0 1 1  Undefined (no operation)
1 0 0  Copy Fifo Count to FCNT Register
1 0 1  Undefined (no operation)
1 1 0  Undefined (no operation)
1 1 1  Undefined (no operation)

FIG. 9. Eight PEs with NF Table Setup Logic

The logic shown in FIG. 9 is eight Processing Elements (PE 21) with the portions of the CTL 26 necessary to configure the NF 33 tables. Refer to FIG. 7 which is the top level diagram of the preferred embodiment of a PEG 10. There you will see the inputs and outputs to FIG. 9. Labelled counter-clockwise beginning at the top left the inputs are DLYI, SERIN, WDATA, ADDR, and CNTRLS. Continuing counter-clockwise the outputs are SEROUT, SERDLY, and DLYO. We find the same signal name on the ports of FIG. 9 but not necessarily in the same spatial orientation.

Inputs and Outputs

FIG. 7 and FIG. 9 show that the inputs to FIG. 9, the number of each, and their sources are the following: DLYI<0:15> which come from the output of the DELs 36, half from each. The DLYI are eight image streams delayed by either one or two DELs. SERIN<0:7> which come from the output Y of GL 22. The SERIN are eight image streams which have come from the previous PEG 10 over input PEPE lines 17 or from the BC 23 over lines FBACK as selected by the GL 22. WDATA<0:7> which come from the DINH register outputs Q. The WDATA are the data which will be written into one address of each of eight one bit NF 33 table memories. ADDR<0:9> which come from the WINC register outputs ADDR. The ADDR are the ten address bits for the NF 33 table memories used during configuration. And finally, CNTRLS<0:10> which come from the CNTRLS<0:10> of FIG. 8. These CNTRLS are the clocks, mode, and command lines for control of data flow during both configuration and run modes.

The outputs of FIG. 9 are all image streams. SEROUT<0:7> and SERDLY<0:7> carry NF 33 data (lines 45 of FIG. 5) and SR 32.4 data (lines 39 of FIG. 5) to inputs A and B of SL 43. DLYO<0:15> carries SR 32 data to the two DEL functions 36, half to each.

Nomenclature

Figure 13A:
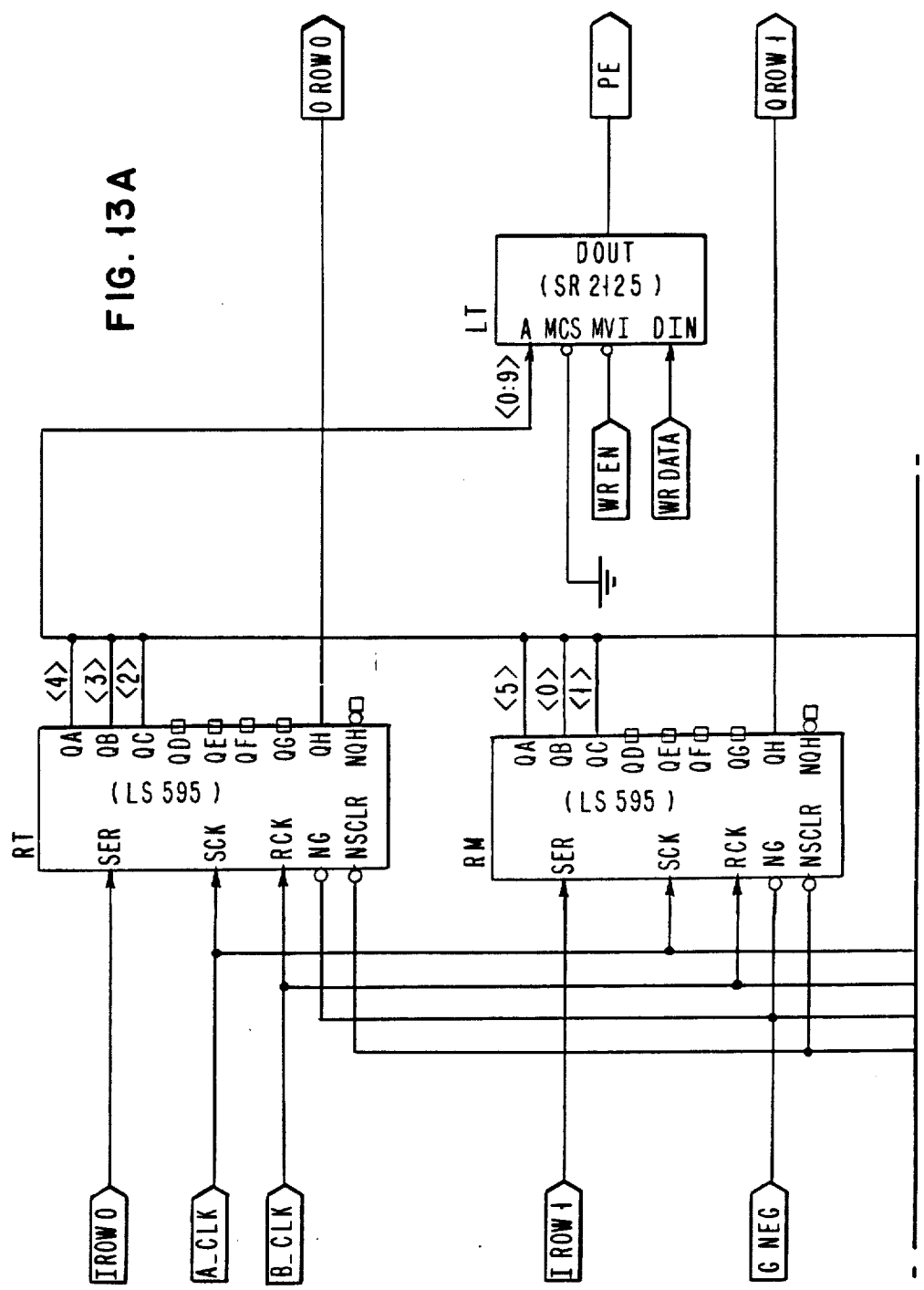
Figure 13B:
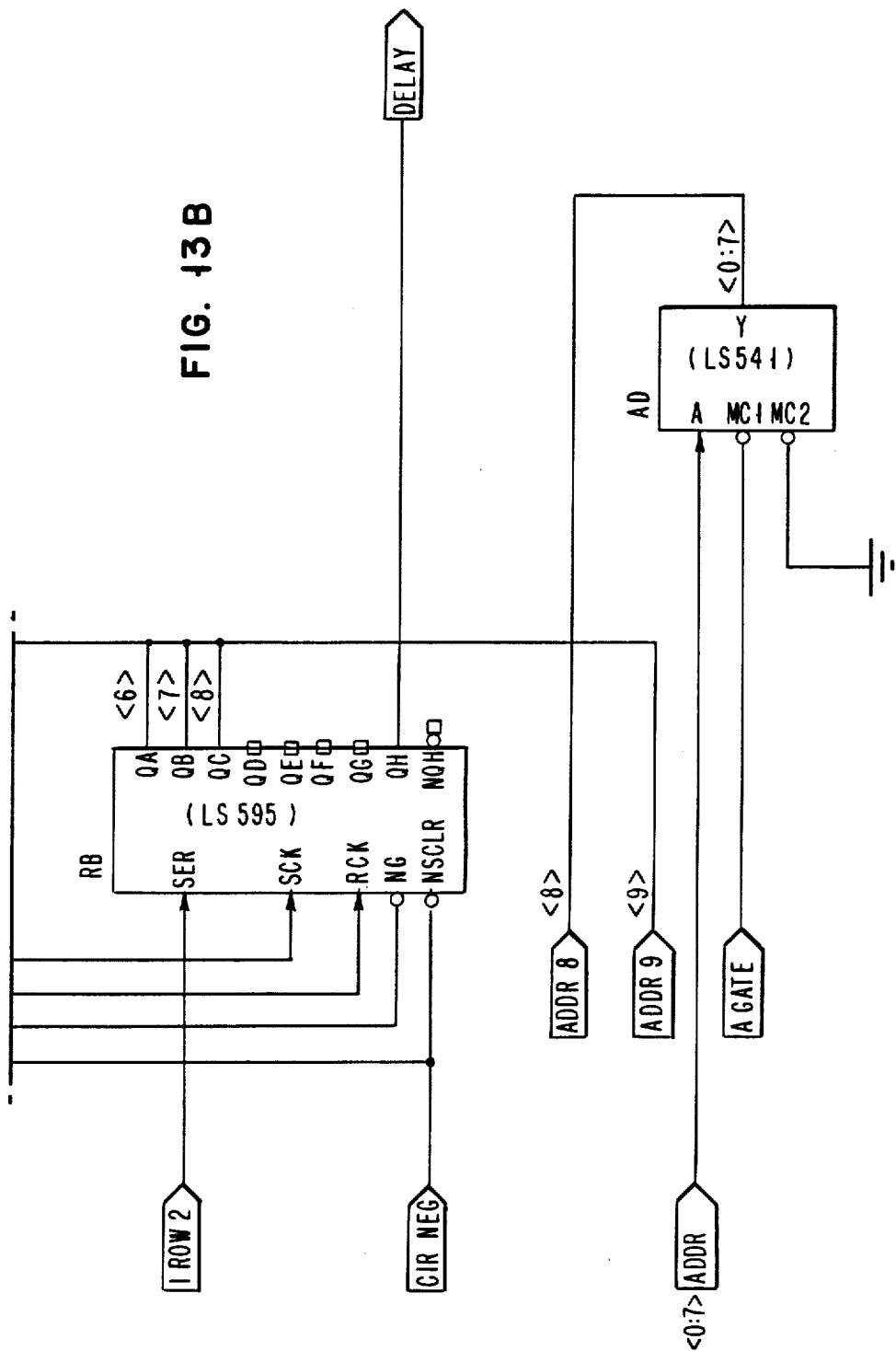

FIG. 9 shows eight replications of FIG. 13, indicated by the *8 over the box marked "FIG. 13." Each replication is comprised of the portion of one PE and associated configuration function which is exactly the same from PE to PE. The convention of BLE for replicated components is two-fold. First, each copy of the component is considered to have its own duplicate set of input/output signal bundles, each with its own index. Second, the indices between input and output lines and the inputs/outputs of replicated portions must either match one for one, or else a single input line is distributed to all instances of the replication. For example, SERIN<0:7> go to eight instances of FIG. 13 at input IROW0, which we label IROW0<0:7>, and hence SERIN<0> goes to IROW0<0>, i.e. the IROW0 input to the zeroeth instance of FIG. 13. A_CLK (the same as CNTRLS<8>) is a single line so it goes to the A_CLK input of each of the eight FIG. 13s. Finally, the input lines ADDR<0:7>, eight in all, each go to all eight instances of the corresponding ADDR<0:7> lines of the eight FIG. 13s. That is to say that ADDR<0> goes to the zeroeth FIG. 13 and to the first FIG. 13 through the seventh FIG. 13, always to ADDR<0> of each figure. The handling of ADDR<1> ... ADDR<7> is similar. This nomenclature will be further discussed in connection with FIG. 13.

The Various Portions of FIG. 9 and Their Function

The three logical groupings of function within FIG. 9 are the Address Buffers, Registers, and the eight PEs as further detailed in FIG. 13.

The Address Buffers ADL and ADM isolate respectively lines ADDR<8:9>, two of the address lines from the WINC register. The other address buffers for lines ADDR<0:7> are shown with the PEs in FIG. 13. These lines repower the WINC register bits and distribute them to the eight NF 33 RAMS so that each RAM may function as a separate memory.

This Registers RE, RED, and RDF are each eight bit (LS374) registers. RE and RED function to put the eight image streams from outputs PE of FIG. 13 through one additional PEL delay. This is accomplished by first loading RE on the rise of A Clock (CNTRLS<8>) with the PEL values of the eight image streams from the PE outputs of the eight FIG. 13s, and then copying the values from RE to both RED and REF on the rise of the B_CLK. This A-B pair constitutes one pel time throughout this specification. Thus, in one PEL time (an A_CLK, B_CLK pair), the image streams advance one PEL position. The function of the registers RE and RED is to delay the image streams one PEL and in the process re-synchronize the data, since the PE outputs of FIG. 13 are not synchronized to the clocks (see FIG. 13).

The function of the register REF in conjunction with register RE is the same as the block FB 42 (FIG. 3) or FB 47 (FIG. 5) They delay image streams are delayed one PEL time and feed them back as the tenth bit of the neighborhood window function NF 33.

FIG. 10. The Boolean Combination Logic BC 23

The logic shown in this figure is the Boolean Combiner and associated portions of the CTL 26 necessary to configure the BC 23. Some portions of FIG. 7, the RSLF and RSLT, are also part of the BC but are not shown in FIG. 10. Refer to FIG. 7, which is the top level diagram of the preferred embodiment of a PEG 10, for the inputs and outputs to FIG. 10. On the left side of the figure, beginning at the top, the inputs are INTPE, EXTPE, ADDR, WDATAH, WDATAL, and CNTLS. From top to bottom on the right the outputs are SBUSH, and SBUSL. The same signal names appear on the ports of FIG. 10 but not necessarily in the same spatial orientation.

Inputs and Outputs

FIG. 7 shows that the inputs to the FIG. 10 and their sources are the following: INTPE<0:7> which come from the output Y of SL 43. The INTPE are eight image streams from the eight PEs within the identical PEG 10. EXTPE<0:3> which come from the output PEXY of FIG. 11. The EXTPE are four image streams which have come from the EBUS as selected by the BD 30 logic contained in FIG. 11. ADDR<0:11> which come from the WINC register. The ADDR are the 12 address bits for the BC 23 table memories. WDATA-H<0:7> which come from the DINH register. The WDATAH are the data which will be written into one byte of an address in the BC 23 table memories. WDATAL<0:7> which come from the DINL register. The WDATAL are the data which will be written into the other byte (from WDATAH) of an address in the BC 23 table memories. And finally, CNTRLS<0:3> which come from the CNTRLS<4,5,7,8> of FIG. 8. These CNTRLS are the clocks, mode, and command lines used within FIG. 10.

The outputs of FIG. 10 are all image streams. SBUSH<0:7> and SBUSL<0:7> carry data as computed each PEL time by the SRAMS within the BC function. The two sets of eight image streams are latched each PEL time into RSLF and RSLT respectively.

The Various Portions of FIG. 10 and Their Function

The four logical groupings of function within FIG. 10 are the Address Buffers, the Image Stream Buffers, the Data Buffers, and the SRAMs used for the actual Boolean Combination calculation.

The Address Buffers ADDD (type LS541) and ADDX (type LS125) isolate respectively lines ADDR<0:7>, and lines ADDR<8:11> which come from the WINC register. These buffers repower the WINC register bits and distribute them to the 4 BCT SRAMS (type IMS1420 from INMOS) for supplying an address to the BC Memory during SET_UP mode.

The image stream buffers PREG and PREGX (both type LS374) both latch and isolate respectively lines INTPE<0:7>, and lines EXTPE<0:3> which come from the 12 PEs accessible by the BC of this PEG 10. These buffers retime and repower the PE outputs from the various SLs 43 for use as addresses by the 4 BCT SRAMS (type IMS1420 from INMOS) during RUN mode.

The Data Buffers DHD and DLD (both type LS541) isolate respectively lines WDATAH<0:7>, and lines WDATAL<0:7> which come from the DINH and DINL registers respectively. These buffers repower the DIN . . . register bits and distribute them to the 4 BCT SRAMS (type IMS1420 from INMOS) and isolate the read data to the BC Memory during SET_UP mode, from the write data from the the BC Memory during RUN mode, since the SR1420 SRAMS are bi-directional port memories.

The SRAMS BCT0, BCT1, BCT2, and BCT3 are INMOS IMS1420 4096 words by four bit per word Static RAMS. They hold the Boolean Combination tables as loaded during SET_UP mode and transform the 12 image stream inputs from PREG and PREGX into 16 image stream outputs SBUSH and SBUSL during RUN mode. Note that the combination of the Data Buffers PREG and PREGX both clocked at A_CLK and the RSLF and RLST registers introduce exactly one PEL time (A_CLK, B_CLK pair) delay to the BC portion of the operation.

General Operation

The operation of the BC during SET_UP mode is very similar to the operation of the PEs and their NF tables during SET_UP mode. Data is loaded by the System bus commands into DINH and DINL and the proper address is attained in the WINC register. Then the data is written into the BCT SRAMS by a rise in CNTRLS<0> originally WR_BCT_N from CNTRLS<4> in FIG. 4. During RUN mode, the twelve input image streams are transformed each PEL time into sixteen output image streams by the BCT SRAMS.

FIG. 11. The Selector Gating for the EBUS Drivers BD 24 and the Input Selection IS 25

FIG. 11 shows the address selection logic for EBUS Driver Logic BD 24 and the Input Selection IS 25. Refer to FIG. 7, which is the top level diagram of the preferred embodiment of a PEG 10, for the inputs and outputs to FIG. 11. Beginning on the top left (FIG. 7) and continuing counter-clockwise, the inputs to the FIG. 11 box are E_SEL, ADD_N, EB_N, and CTL. From left to right across the top the outputs are PEXY, and PSEL_N. The same signal names appear on the ports of FIG. 11 but not necessarily in the same spatial orientation.

Inputs and Outputs

FIG. 7 shows that the inputs to the FIG. 11 and their sources are the following: E_SEL<0:11> which come from the WINC Register outputs ADDR. The WINC contents, during RUN mode, hold four three bit addresses used to select the PE image streams from the EB 9. ADD_N<0:2> which come from the output ADR of the ADD block. The three bits of ADD_N are the address of this PEG 10 within this cage and are used by the BD 24 logic to activate the proper drivers. EB_N<0:3> which come from the EB 9, active at a negative level. The final input is CTL which comes from CNTRLS<5> of FIG. 8. This CTL is the RUN mode signal used to activate the EBUS gating.

The outputs of FIG. 11 are the following. PEXY<0:3> carries the four PE image streams selected from EB 9 by IS 25 to the EXTPE input of FIG. 10. PSEL_N<0:7> carry the decoded PEG 10 address to the Bus Driver logic BD 24 in FIG. 12.

The Various Portions of FIG. 11 and Their Function

The two functions within FIG. 11 are the Address Decoder DCD (type LS138) and the Multiplexing Selectors (type LS151—a one of eight selector).

The decoder DCD generates 1 out of eight PSEL_N lines active during the time CTL (RUN mode) is true. The PSEL_lines activate the proper BUS Drivers in FIG. 12. For instance, if the address of this PEG 10 is Hex 6, then Y1 (ones complement of 6) will be negative and the rest of the Ys from DCD will be positive.

The multiplexor selectors MX0, MX1, MX2, and MX3 function as four eight to one selectors. Each operate on a different set of eight EBUS 9 signals, to select exactly one of the eight to output PEXY. The selection is according to the four three bit codes E_SEL (which comes from WINC). Thus PEXY<0> will be one of the EBUS<0:7> signals depending upon the three bit code on E_SEL<0:2>.

FIG. 12. The EBUS Driver Circuits of BD 24

The inputs and outputs to FIG. 12 are shown in FIG. 7, the top level diagram of the preferred embodiment of a PEG 10. Note that FIG. 12 is replicated four times in FIG. 7. The inputs to FIG. 12 are SEL_N<0:7>, and PE, this latter a single signal from among four. On the bottom the output is DRVRS<0:7> which since FIG. 12 is replicated four times make up the 32 signals on EB 9. These inputs and outputs are seen in FIG. 12 but not necessarily in the same spatial orientation.

The SEL_N signals (only one at most of eight are negative active) are used to activate one of eight tristate drivers in either A or B (type LS125). The eight driver outputs Y go to DRVRS<0:7>. The PE input is one from among four of the outputs Y<4:7> of SL 43.

The output of FIG. 12 is the following: DRVRS carry the one PE image stream stream arriving at this instance of FIG . 12 to the bit within the eight which corresponds to the address of this PEG 10. The rest of the DRVRS<0:7> will be inactive. Hence it is seen that FIG. 11 and FIG. 12 working together cause the four PE streams at Y<4:7> of SL 43 to be activated onto exactly four positions on the EBUS 9, those four positions depending upon the PEG 10 address within ADD.

FIG. 13. One PE with SRs 32, and Configuration Hardware

The logic shown in FIG. 13 is one Processing Element (PE 21) plus portions of CTL 26 necessary to configure the NF 33 tables. Refer to FIG. 9, which is a higher level diagram of a grouping of eight PEs 21, for the inputs and outputs to FIG. 13. Reading on the left side, from top to bottom the inputs are IROW0, IROW1, IROW2, WRDATA, ADDR<0:7>, ADDR8 ADDR9, G_NEG, CLR_NEG, A_CLK, B_CLK, AGATE, and WREN. The outputs, reading on the right side, from top to bottom are OROW0, OROW1, PE, and DELAY. We find the same signal names on the ports of FIG. 13 but not necessarily in the same spatial orientation.

Inputs and Outputs

Looking at FIG. 9, and remembering that FIG. 13 is replicated N=8 times, inputs to FIG. 13 and their sources are the following: IROW0 which comes from the input SERIN<N> from FIG. 9, where N from 0 to 7 represents the index of the PE within the PEG 10. For the source of SERIN and other inputs to FIG. 13 which come directly from the inputs to FIG. 9, see FIG. 7, and the description of FIG. 9. In effect, signals may go through a renaming with each BLE level of the hierarchy through which they pass. The input IROW1 which comes from FIG. 9 input DLYI<N>, see 0≦N≦7 or equal (outputs from one DEL 36 in FIG. 7). The input IROW2 similarly comes in the same way from the second DEL 36, via input DLYI<M>, 8≦M≦15. IROW0, IROW1, IROW2 name the successive rows of the image from whence the PELS arrive at the window; the numbering corresponds to the actual image only when the total delay between a PEL at the start of ROW0 and a PEL at the start of ROW1 exactly equals one one of the image. The input WDATA, which comes from WDATA<N> of FIG. 9, is the one bit of data which comes from the DINH register which will be written into one address of the NF 33 memory. The inputs ADDR<0:7> which come from th WINC register bit <0:7> via ADDR<0:7> of FIG. 9. The input ADDR8 which comes from the WINC register bit 8 via ADL output Y<N> of FIG. 9. The input ADDR9 which comes from the WINC register bit 9 via ADM output Y<N> of FIG. 9. The ADDR are the 10 address bits for the NF 33 table memories. The control inputs G_NEG, CLR_NEG, AGATE and WREN, which come respectively from CNTRLS<7,6,5,0> of FIG. 9, which came originally from CNTRLS<7,6,5,0> of FIG. 8. G_NEG is used to activate the outputs of RT, RM, and RB during RUN mode (signal negative active); CLR_NEG is used to reset RT, RM and RB during Master Reset (signal negative active). AGATE is used to activate the address from the WINC register to the address (the A inputs) lines of the NF 33 RAM which in FIG. 13 is the component LT, and WREN is the write enable signal, which comes from CNTRLS<0:7> of FIG. 9 and FIG. 8, and which actually stores the WRDATA signal into the NF 33 component LT (rising edge active). The final results are the clocks A_CLK and B_CLK, which come ultimately from FIG. 8 CP3 and CP2 respectively and provide the 1 PEL time advance clocks during RUN_MODE.

The outputs of FIG. 13 are all image streams. OROW0, OROW1, DELAY and PE each carry one image stream to the two halves of the ouput DLY0, to the D inputs to register RE, and to the output SERDLY of FIG. 9.

The Various Portions of FIG. 13 and Their Function

The three logical groupings of function within FIG. 13 are the Shift Registers, the Address Buffer, and the neighborhood function static ram SRAM.

The Shift Registers SR 32 are contained in the three LS595 components RT, RM, and RB. Each LS 595 is an eight bit serial in, parallel out shift register which advances the PEL on input SER to output QA in one PEL time (one A_CLK B_CLK pair when applied to inputs SCK and RCK). Similarly, in one PEL time a PEL at QA will advance to QB and etc. Hence, it should now be apparent that the QA, QB, and QC taps of the LS595s RT, RM and RB will contain nine PELS which constitute the image window of the preferred embodiment. These nine bits, along with the tenth bit from the FB 42 (Output Q, FIG. 9) will be the address bits to input A of the SRAM during RUN_MODE.

The Address Buffer AD isolates lines ADDR<0:7>, eight of the address lines from the WINC register. The isolation of ADDR<8:9> was accomplished by the ADL and ADM blocks of FIG. 9 already discussed. These lines repower the WINC register bits and distribute them to the ten address lines of the NF 33 (LT inputs A) for addressing SRAM LT during SET_UP MODE.

The Neighborhood Function Table, NF 33, is accomplished by block LT, an Intel 2125 chip which is a 1 bit by 1024 word static ram.

During RUN_MODE, the signal G_NEG activates the LS595 outputs to the A inputs to block LT. During SET_UP the address bits will be activated instead through block AD (LS541) by the AGATE signal and through the ADL and ADM blocks of FIG. 9 by signal CNTRLS<5> (same as AGATE). Thus we can now understand that the NF 33 memories are written during SET_UP mode by writing the contents of register DINH (input WRDATA) into the eight LT blocks at the address held in register WINC as applied to LT inputs A<0:9>, one bit of DINH per LT. This writing will occur at the rise of WREN (Write Enable) which came originally from one of the opcode decode lines CNTRLS<0> or WR_LLUT_N in FIG. 8, and ultimately from the WRITE COMMAND line of the IEEE 796 bus.

The following sequence of System bus commands from TABLE 2 will configure the LT memories:
  LOAD WINC with 0 (starting address)
  Loop: LOAD DINH with 8 result bits for 8 PE's for window configuration input equal to WINC
  WRITE LLUT eight NF 33 gets one bit of DINH value at address WINC
  INC WINC go to next address, return to loop if not finished with all 1024 possible windows, otherwise exit.

Similarly, the sixteen result bits of the BC 23 SRAM can be written. Additional commands set DINH, DINL and WINC to the desired values.

In RUN_MODE, image streams advance one PEL per PEL time. The path through one PE of one PEG is into RT/RM/RB on A_CLK, to output of RT/RM/RB on B_CLK, through NF 33 lookup function into RE on A_CLK and into RED and REF on B_CLK (from REF into window computation next PEL time). From REN to PREG (FIG. 10) directly, or to PREGX of another PEG IS 25 on A_CLK, and through BCT(FIG. 10) into RSLF or RSLT on B_CLK. Hence the constant delay of a PEG is three REL times in addition to the one row, one column delay to delay the image to the center PEL of the neighborhood window.

FIG. 14. Description of the CAGE Distributor D 11

Refer to FIG. 14 which is the top level diagram of the preferred embodiment of a CAGE Distributor, shown in FIG. 1 as box D 11. The function of a CAGE Distributor can be thought of quite simply as a CAGE level Boolean Combiner. The operation is very analogous to the BC function in the PEGs and will not be described in much detail here. Some of the facilities within FIG. 14 more logically associate with the function of E 12, but are described here because the two diagrams separate logic packaged on different boards. Inputs on lines 17 from the previous PEG 10, and from the EB 9 over lines 16 are selected and combined to produce several image streams. These image streams leave the CAGE on lines 17 to C1 4, to C2 5, ... to Cn 6, and from Cn 6 to M 7 on lines 8. When CAGEs are cabled in linear order, and on lines 18 when CAGEs are cabled other than in linear order, and on lines 19 to the Enumerator function E 12.

Inputs and Outputs

The inputs to each D 11 are PEPE<0:7>, MB_D_I<0:15>, MB_CLK, SELECT<0:7>, C_B_I<0:5> and E_B_I<0:31>. Inputs PEPE correspond to lines 17 in FIG. 1 and bring eight image stream values from the last PEG 10 in a cage. MBI_N correspond to a portion of the lines 14 in FIG. 1 and bring the needed lines of the System bus. The MB_CLK and SELECT inputs are also part of the signal group 14. MBI_N, MB_CLK, and SELECT collectively correspond to the MBI_N signals of FIG. 7, which are required to execute the commands used by the Host H 0 through Control Card CC 1 to configure the D 11 to one of its possible configurations. However, some slightly different combination of actual System bus signals on the P1 connector are used by the D 11 as contrasted to those used by the PEGs 10. The Instructions which are decoded by the D 11 are also listed in TABLE 2 (supra). The CBI_N<0:4> inputs are also part of the signal group 14 but are generated specifically by the CC 1 hardware, and one line is specific to an individual cage. These lines are control signals and clocks which are active during run mode. The CBI_N lines, like the MBI_N etc. signals, are also distributed by the system bus repowering capability of the CC 1 hardware, but are assigned positions on the P2 portion of the Bus rather than on connector P1. The E_B_I<0:31> signals lines 15 are the Enumerator Bus positions. They are also distributed physically over a portion of the system bus P2 connector.

The ouputs of the D 11 are SEPE<0:7>, SEPEX-<0:7>, and XACKB (which is part of lines 14 to the CC 1), and SERIN<0:7> SELPE<0:7>, INTV<0:7>, MODE<0:7>, and XADD<0:15>, which all go over lines 19 to E 12. The SEPE<0:7> signals are lines 17 which carry eight image streams from a D 11 to the first PEG 10 of the next cage. The SEPEX-<0:7> signals are lines 17 which carry eight image streams from a D11 to the first PEG 10 of a second cage if the system is cabled in other than a direct linear fashion. Note that in fact, it could go to any PEG 10 in any cage, as long as the cable normally carrying lines 17 from PEG 10 to PEG 10 was disconnected. The XACK signal carries the system bus command acknowledgement and is logically part of the P1 signals of the system bus lines 14. The SERIN<0:7> signals are part of lines 19 which carry eight image streams from a D 11 to the Enumerator E 12 FIG. 15. As the reader can readily see, these SERIN are formed in precisely the same way as the SERIN inputs to FIG. 9 are formed in FIG. 7. The SELPE<0:7> signals are also part of lines 19 and they carry the eight values from the TAKE register (type LS374) to be used a bit by bit mask of the SERIN stream within the E 12 logic FIG. 15. The INTV<0:7> signals are also part of lines 19 and they carry an eight bit number from register INTV (type LS374) to be used within the E 12 logic FIG. 15 as will be described in the discussion for that figure. The XADD<0:15> signals are also part of lines 19 and they carry a sixteen bit number from register XA (details not shown) to be used within the E 12 logic FIG. 15 as will be described in the discussion for that figure.

The Individual Components of FIG. 14.

The functional operation of the individual portions of the CAGE Distribution D 11 is shown in FIG. 14.

The DINH is a 8 bit register (LS374) which functions as a holding register for data on the way to a cage BC (Block S type EBUSBC) via inputs WDATAH during configuration mode so the memories in these two functional portions can receive configuration data. During run mode the contents of DINH control on a bit by bit basis the eight paths in SELA via inputs C. Hence the operation is entirely analogous to the use of DINH in the PEG 10 logic already described.

The DINL is a 8 register (LS374) which functions as a holding register for data on the way to a cage BC (Block S type EBUSBC) via inputs WDATAL during configuration mode so the memories in this functional portion can receive configuration data. During run mode the contents of DINL control on a bit by bit basis the eight paths in SELB via inputs C. Hence the operation is nearly analogous to the use of DINH in the PEG 10 logic already described.

The XA register is a 16 bit binary counter register (details of implementation not shown) which functions as a holding register for address data during configuration mode. The address in XA addresses the BC memory over lines block S when the data in DINH and DINL is being written into those memories. Note that since the BC memory of the D 11 is 24 bits wide, two different write commands are provided to transfer a full 24 bits. During SET_UP MODE the operation of XA is entirely analogous to that of WINC in the PEG 10, previously described. During run mode the XA counter counts A_CLKs, and provides the clock count to the Enumeration Logic E 12 from whence it will be logged an sent to the Host 0 each time there is an on PEL in the unmasked image streams. The XA counts by a modulus controlled by the contents of the MODH and MODL registers which action will be described next.

The MODH is a 8 bit register (LS374) which functions as the most significant half of the modulus value which determine at what count the XA counter recycles to zero. The modulus value is derived from the width of the image in PELs, and is particularly useful in applications where the image width is not a integer product of some integer power of 2. The XA register will hold the X address in the image, offset of course by the amount of accumulated delay which has built up as the images to be enumerated have progressed through some variable number of PEs.

The MODL is a 8 bit register (LS374) which functions as the least significant half of the modulus value. Both MODH and MODL will have their values loaded from the host H 0 over the system bus by commands executed during the SET-UP mode, in a similar way to other registers.

The EQ box is a sixteen bit comparator, two ALS519 chips. It functions to determine when the count in XA is equal to the contents of MODH and MODL. Note that because the XA counts from 0 to LINE WIDTH minus 1, the value of MODH and MODL must be set to one less than the desired modulus of the XA cycle. Logic within the control portion box CM - function EBUSCMDS detects when equality has been reached and signals counter XA over some of the CT<0:17> lines to reset to zero rather than increment on the next A_CLK.

The TAKE is a 8 bit register (LS374) which functions as a mask on the SERIN image data streams. Thusly, the enumeration of selected image streams can be enabled and disabled independently of the configuration of DINH, and the BC contents, which were established during SET_UP mode. TAKE can be loaded at any time by H 0 over the system bus.

The INTV is an 8 bit register (LS374) which functions as a holding register for a value used by the E 12 FIG. 15 to sense when the FIFO holding enumerated data is getting close to full. The operation of the FIFO and the use of the INTV value will be discussed under FIG. 15.

The DBL, DBX, and DBH are three inverting 8 bit buffers LS540 used to gate System bus Data from a 16 bit wide path to the various registers DINH, DINL, TAKE, INTV, MODE, XA, MODH, and MODL depending upon the setting of the System bus Byte High Enable Bit. Again, the choice of method for transferring values from H 0 to D 11 is not crucial. There are several ways of performing the transfer of data between Host 0 and various portions of the image processing system.

The ARB is an inverting 8 bit buffer LS540 used to isolate and repower System bus Address Data on the SELECT inputs which are sent to the Control portion of the D 11 on input lines CMDS. The Control portion will be described later.

The RSLF is an 8 bit register (LS374) which functions as a holding register for eight of the BC results. The purpose of this register is to balance the timing as image data moves from the cage BC to the enumerator E 12 via inputs A on SELA and hence to SERIN of FIG. 15. This occurs during run mode. The register has no function during configuration mode.

The RSLT is an 8 bit register (LS374) which functions as a holding register for eight of the BC results. The purpose of this register is to balance the timing as image data moves from the cage BC to the next cage via inputs A on SELB and hence to output SEPE (Lines 17). This occurs during run mode. The register has no function during configuration mode. The function of the RSLF, RSLT, and RSLX registers (FIG. 14) are entirely analogous to those of RSLF, RSLT and RSLX respectively as already described in connection with PEG 10.

The RSLX is an 8 bit register (LS374) which functions as a holding register for eight of the BC results. It is analagous to the RSLT register, except that its output goes both directly to the next PEG as connected by output SEPEX and also via inputs A on SELB and hence to output SEPE (Lines 17). This occurs during run mode. The register has no function during configuration mode. The operation of SELA is entirely analogous to that of GL 22 (FIG. 7) already described in connection with PEG 10.

The SELA is eight two way multiplexors, implementation not shown, each one of which selects signal A from the RSLF register or signal B from the RSLT register in a previous PEG, according to the control value in the corresponding bit of register DINH over line C. The selected values at output Y goe go the E 12 over ouput lines SERIN.

The SELB is eight two way multiplexors, implementation not shown, each one of which selects signal A from the Q output of RSLT or the Q output of RSLX according to the control value in the corresponding bit of register DINL over line C. The output lines Y go to the next cage via output lines SEPE (line 17 FIG. 1).

The function of the remainder of the boxes in FIG. 14, namely box A (type XACKGEN1), box CM (type EBUSCMDS), and box S (type EBUSBC), are very similar to functions already discussed in FIG. 7 for the PEG 10, although not one for one in function. They are the CONTROL, and the cage BC functions. XACKGEN1 and EBUSCMDS together perform the equivalent function as the combination of the ADD and FIG. 8 portions of FIG. 7. The EBUSBC is entirely analagous to the FIG. 10 portion of FIG. 7 except that the memories are 24 bits wide, and their addressing space is selected by the designer to accommodate as much or as little Boolean Combination function as desired. The result is that one may logically think of the D 11 box as one extra BC whose inputs come only from the EBUS 9 and whose outputs are combined for transfer to the next cage or to the Enumeration function E 12 of this cage for further processing.

It should be clear to one practiced in the art that the implementation of the subportions of D 11 is nearly entirely analogous to that of similar or identically named sub-portions of PEG 10. Hence, no further detail will be given.

FIG. 15. Description of the CAGE Enumerator E 12

FIG. 15 is the top level diagram of the preferred embodiment of an Enumerator, shown in FIG. 1 as box E 12. The function of an Enumerator can be thought of quite simply as a mechanism for sending an encoded image to the host H 0. The encoding rule chosen for implementation in the preferred embodiment is to send the clock count for the occurrence of each "on" pel in an image. The clock count is equivalent to the number of pels which have been shifted into the first PEG 10 in the first CAGE C1 3, since the system was configured. The accumulated hardware delay in pel times for a PEL to travel from the output of M 7 to the mechanism in E 12 which senses that pel can be easily calculated as a function of the network configuration. The physical location of the "image feature" which resulted in a pel to be enumerated is the total clock count less the accumulated delay. Knowing the image width allows the X-Y location of the feature in the original image to be determined.

Configuration information is received over lines 14 from the CC 1. Then in RUN mode, image streams and control information are received over lines 19 from D 11 and encoded information is sent to the H 0 through CC 1 via the multibus transfer mechanism over lines 14. The primary function of the E 12 logic is to count clocks, and buffer the counts for ease of transfer to the H 0. It is desirable that this transfer go on asynchronously with the image processing going on in the PEGs 10 and the D 11. Since there is an image buffer in M 7 to hold the incoming image, and buffers within each E 12 to hold the outgoing (to the H 0) encoded image information, a simple method exists for avoiding loss of data, irrespective of data transfer timing. We just stop the clocks in the CAGEs when anyone of the buffers in the E 12 logic are in danger of overflowing, while allowing the input image or images to accumulate in M 7.

Inputs and Outputs

The inputs to the E 12 can be thought of in three distinct groups. The first group are those in lines 14 from CC 1. These signals are SELECT<0:7>, C—B_I<0:6>, and MB_CLK. They correspond generally to the multibus P1 and P2 signals, already discussed in connection with the PEG 10 FIG. 7 and the D 11 FIG. 14, although the exact names and indices do not necessarily agree. Their function is for transfer of control information during setup mode, and during run mode for the transfer of data to H 0 over outputs MB—D_O<0:15>. The E function in contrast to all the other functions does transfer information over the multibus during the Run mode. However, this is usually not from H 0 to the E 12 to change the configuration, but from E 12 to transmit encoded image information to the host H 0. The exception to this is that one command implemented in D 11 called LOAD TAKE which is operative in both SETUP and RUN modes which changes the value of the TAKE register in FIG. 14 and hence influences the operation of E 12 logic via lines SELPE. This function logically belongs to the FIG. 15 Enumerator function, but it is shown implemented in FIG. 14. The second group of input signals are those which come from D 11 over lines 19. They are INT-V<0:7>, SERIN<0:7>, XADD<0:15>, SELPE<0:7>, and MODE<0:7>. Their use was described in connection with D 11 (FIG. 14), except for XADD<0:7>, which is the count value. The third input group is the input DLYI<0:7>. For purposes of exposition, it is easiest to think of the outputs DLYI<0:7> connected directly to the inputs DLYI<0:7>. In this way they become of no effect, since the DLYI and DLYO ports of the EXYPENUM function are both carry eight bit image streams, DLYO a source, DLYI a sink and the connection of the two is equivalent to a connection made internal to EX-YPENUM. In practice, it is possible to add a function equivalent to DEL 36 of FIG. 7 between DLYO and DLYI, also connected to its own multibus signals to allow a variable programmable delay to each of the eight image streams on outputs DLYO before they are actually enumerated at DLYI. This additional variable delay will allow the independent image streams to be lined up in time and space, so that one position code will suffice for all streams without any additional calculation by the Host H 0 to accommodate the hardware delays, which are variable as a function of how the images have come through the PEGs. That is to say the additional delay of an extra DEL (not shown in any figures) is to created equal hardware delays for all eight image streams to be enumerated. In the preferred embodiment, we choose to make this compensation by calculation in the Host H 0.

The outputs of E 12 are MB_D_O<0:15>, XACK, WAIT, INT<0:7> and DLYO<0:7> and they form a portion of lines 14 to CC 1. MB_D_O<0:15> are the 16 data lines of the System bus (in this case an output of FIG. 15 since the data transfer direction is inward). XACK is the Command Acknowledge signal. INT<0:7> are the multibus Interrupt Request Lines used to signal H 0 through CC 1 that the data buffers within E 12 have reached some level, and should be emptied by the host H 0. MB_D_O, XACK, and INT (together with SELECT, MB_CLK, and C_B_I) constitute the multibus used by E 12. DLYO has already been discussed. WAIT is a single line which goes over lines 14 to CC 1 to signal the CC 1 that the clocks must be stopped (within a fixed number of cycles) in order to avoid a data buffer overflow situation.

Individual Components of FIG. 15.

FIG. 15 shows the functional operation of the individual portions of Enumerator E 12.

The EXYPCMDS block is similar in function to FIG. 8 of the PEG 10. It serves to decode multibus instructions, and to distribute the clocks and mode signals to the rest of the logic in the FIG. In conjunction with the XACTGEN1 logic for signalling Command Acknowledge the operation of the EXYPCMDS operates to perform the instructions listed under the EXYP card section of the Instructions Table 2. In addition, there are two other operations within EXYPCMDS which are slightly different than other instruction decoding we have seen. A Read Command (see EXYP READ Group in Table 2.) cannot be acknowledged until such time as the data buffer (EXYPFIFO) signals that there is data ready for transmission via line READY. Only then can EXYPCMDS signal the XACKGEN1 over BDEN_N that a command has been properly decoded. A system hung state is avoided by giving the Host H 0 access to information which will guarantee to it that if a READ command is issued, the READY condition will already exist. This is discussed further under the discussion of the WARN and FULL outputs of EXYP-FIFO and EXYPINTR respectively. The EX-YPCMDS also received the LEND signals as part of the MODE lines from D 11 which indicated Line End for one line of the image. This information is used by EXYPCMDS to signal ZA (EXYPZCNT) to advance the line count. Box ZA (EXYPZCNT) is a 16 bit binary counter (implementation not shown) which counts the image lines. The reader will understand that the end of line signal LEND to ECYPCMDS is a function of the values in the MODH and MODL registers and the XA counter of D 11, and does not have to correspond to the end of physical lines or rows in the image. Hence ZA counts the number of times the XA counter has been reset to zero.

The function of box XP (EXYPENUM) is to detect the occurrence of an enumeration event or events (an "on" pel in one or more of the enabled or unmasked image streams arriving on SERIN), and to save the identity of that event/s along with the XA (FIG. 14) count value associated with that event/s until it can be entered into the data buffer FF (EXYPFIFO). The inputs of XP are as follows, reading from the top counter-clockwise: DLYI<0:7>, SERIN<0:7>, XADD<0:15>, SELPE<0:7>, CTB<0:7>, CTX<0:17>, and ZCRY. The outputs beginning at the top right clockwise are DLYO<0:7>, TAKE, X_Y_P<0:31>, and HIT_B. DLYI are the eight image streams which are either DLYO or DLYO delayed. In either case, the DLYI are equal to the SERIN inputs, although delayed by the amount of delay within a DEL connected between DLYO and DLYI plus one additional pel time delay which occurs within XP (necessary to avoid timing races). SERIN is the eight image streams which have been directed to the E 12 logic by the D 11 logic. XADD is the XA count from D 11. SELPE is the eight bit mask from D 11 which is used to selectively enable on a stream by stream basis the image streams arriving over SERIN. CTB is equivalent to the MODE inputs to FIG. 15 from D 11, and signifies a variety of options as to how the high order (significant) portion of the X Y enumeration data is to be encoded. For purposes of this application, we will discuss only the option which uses the full 16 bits of XA and the full 16 bits of ZA. CTX are the CNTRLS lines form the CM box (EXYPCMDS) which carry the clocks, modes, and incidental control signals to XP. Finally, ZCRY is the carry signal from counter ZA which is used within XP to signal the overflow of the ZA counter. In the preferred embodiment, the ZCRY is used as if it were a ninth enumerated event, and causes data to be generated just as if there were an enumeration, except that it may coincidentally happen that there is no enumerated event of real "on" PELs at the exact clock time that the ZA counter overflows, in either case the Host 0 will be able to infer that the ZA counter has an overflow.

The outputs of XP (EXYPENUM) carry the following information: DLYO carries eight image streams. TAKE signals the data buffer FF box (EXYPFIFO) that data for another enumerated event should be pushed into the buffer. X_Y_P<0:31> is part of the enumerated event data which is 48 bits in all counting the ZA value. The data in X_Y_P consists of 16 bits of the pel address within the row (XA register value at time "on" was seen by the XP logic), 8 bits of an encoded row address (YA register inside XP—details not disclosed since this is a second but not preferred embodiment), and 8 bits of PE address data (at bit in position n indicates SERIN<n> was on - and multiple ones, as well as all zeroes in the case of ZA overflow are possible). The PE address is "nearly" equivalent to a one pel time slice of all the non-zero pel time slices of the the SERIN data stream as masked by the SELPE data. The HIT_B line will go true at the time that the ZA counter should be collected in ZB (a 16 bit register of 2 LS374s) to join the rest of the enumerated data on X_Y_P as it is sent to the buffer FF on lines DI.

The function of the XP box, implementation not detailed, is to collect the XA and YA values and the SERIN values each time there is an enumeration event, and to present such values in proper timing for entry into the data buffer FIFO in box FF.

The function of box FF (EXYPFIFO) is to collect the enumerated events in a FIFO buffer for subsequent transmission to the Host H 0 via the EXYP card READ commands. It functions as a data buffer with the capability to signal the CC 1 logic if a data overflow situation is about to occur.

The inputs to FF, reading counter-clockwise from the top left are SI, DI<0:47>, CTL<0:19>, MODE<0:3>, and GAGE<0:7>. DI contains the full position data for an enumerated event, namely 16 bits of X, 16 bits of Z (the extended X), 8 bits of Y, and 8 bits of image (one pel time across the eight enumerated streams.) We subsequently refer to the image information as the P byte. This information comes from XB, YB and ZB, respectively. SI is the signal which transfers the DI data into the FIFO on its rising edge. It is generated in XP on the A_CLK following the occurrence of HIT_B. CTLS are the pertinent timing signals from the CNTRLS output of box CM. They contain the clocks, modes, and decoded instruction signals necessary for the FF function. MODE contains information from the D 11 over lines MODE which indicates what portions of the DI are pertinent. In the preferred embodiment, all three double bytes of DI (2 bytes of X, 2 bytes of Z, and 2 bytes comprising one of Y and one of P) will be transmitted. Other options of the MODE will not be discussed. The final input is the GAGE lines from D 11 over inputs INTV. The number on the GAGE indicates at capacity level the FIFO controls in FF are to signal the Host via an interrupt that enumerations have now been collected to the proscribed amount. This signalling is done over the WARN output to box IN which actually posts the interrupt to the H 0.

The outputs from FF (EXYPFIFO) reading from the top right clock-wise are FULL, WARN, READ<0:7>, and READY. WARN we already discussed. FULL is the line which indicates that the FIFO is nearly full. This line is sent via box IN to the WAIT line and thus to CC 1. There it will be used by the CC 1 to stop the clocks before too many more enumeration events can overflow the buffer. The FIFO level at which FULL should be activated is a detail which depends upon the mechanics of the E 12 to CC 1 signalling, and other implementation details not germane to the patent application. One skilled in the art can design similar and equally effective means for performing the function - namely to stop the clocks, hence stopping the images advancing in the CAGEs, hence avoiding additional enumerated points from being seen by the E 12, hence avoiding another event for an already full FIFO within the E 12. The system thus accommodates itself to times of infrequent bursts of enumerated events without requiring a high band-width between E 12 and H 0. The system fails only when the integrated time the clocks are stopped is so great then the amount of image collected during that time will overflow the M 7. The next output of FF is READ which contains the count of the number enumerated events in the FIFO buffer at the last time the H 0 issued a COPY FIFO COUNT to FCNT REGISTER command (see EXYP MISC Group Table 2.) The true FIFO count cannot be reliably sampled by the H 0 because an enumerated event may occur during the sampling time (as H0 commands and Cage clocks A_CLK and B_CLK are asynchronous). The COPY command makes the true FIFO count available at the READ output whence it will be read into H O by a subsequent READ FCNT instruction. It is this FCNT value which enables the H 0 to avoid an interlock condition, as follows: During SE-T_UP the INTV value is established in D 11. Then H 0 will issue commands to CC 1 to enter RUN Mode and start the image clocks. When enumerations accumulate in any E 12 to total the INTV amount, an interrupt from E 12 to H 0 will signal the need for service. The H 0 may then read up to INTV events without fear of interlocking the READ commands because of lack of data in the indicated FIFO. However, if the H 0 wants to read E 12 enumeration data prior to receiving the interrupt, (i.e. if the application code in H 0 works in polling rather than interrupt style), then the H 0 may poll any selected E 12 with a COPY FIFO . . . command, and then a READ FCNT command to determine a lower bound on the number of enumeration event data available from said B 12. The next output READY signals CM over input line READY that a full set of X, P and Z data has trickled to the output of the FIFO and is available for reading by H 0. Since READY will always occur a predictable time (the FIFO fall-through time) after an enumerated event first entered the FIFO and was counted, there will never be an excessive wait for READY. READY as we have already explained is used within EXYPCMDS and XACKGEN to enable the acknowledgement to the H 0 that a command has been completed. The last output DO<0:47> is the FIFO output which will be sent to the H 0 during READ commands by box DVR. DO contains the same collection of information as DI, delayed by the fall through time of the FIFO and the timing of the mechanism for reading the FIFO values.

The IN (EXYPINTR) block issues interrupts to the H 0 over signal INTV<N> of INTV<0:7> depending on the which CAGE N the E 12 the hardware is located.

The DVR (EXYPDVR) gates the enumerated data XYPZ and E 12 STATUS onto the system bus, in keeping with the MULTI-BUS (TM) specification, either one or two bytes at a time, depending on the actual READ command and the Bus Convention signals BYTE HIGH ENABLE. The actual implementation of such a function should be easily done by one skilled in the art.

Thus, while the invention has been described with reference to a preferred embodiment, it will be understood by those skilled in the art that the foregoing and other changes in form and details may be made without departing from the scope of the invention.

What is claimed is:

1. A configurable parallel processing element pipelined system, for image processing with computational efficiency within available capacity comprising:
   (a) image means for providing image data;
   (b) image processing subassembly CAGE means (one or more of 3, 4, 5 . . . 6) operatively connected to said image means for receiving image data, each CAGE comprising repowering repeating means (RR 20), a plurality of configurable processing element groups (PEGs 10) for processing said image data without storing a full iconic image within any of said processing element groups, and CAGE exit means (11–12, 17–18);
   each PEG (10) comprising
   a set of processing elements (PEs 21) each having input and output; and
   a boolean combiner (23), having inputs and outputs, a first portion of said inputs being connected to the outputs of said set of processing elements within its PEG and a second portion of said inputs being connected to at least one other PEG, having as outputs a set of boolean combined image transfer switches, a subset of which is feedback connected to said PEs within its PEG and a subset of which is forward connected to a receiving device to outside its PEG, and
   (c) control means coupled to said image means and said image processing subassembly CAGE means for enabling a variety of interconnections of processing elements to be achievable.

2. A configurable parallel processing element pipelined system, for image processing with computational efficiency within available capacity comprising:
   (a) image means for providing image data;
   (b) image processing subassembly CAGE means (one or more of 3, 4, 5 . . . 6) operatively connected to said image means for receiving image data, each CAGE comprising repowering repeating means (RR 20), a plurality of configurable processing element groups (PEGs 10) for processing said image data without storing a full iconic image within any of said processing element groups, a bus (9), and CAGE exit means (11–12, 17–18);
   each PEG (10) comprising
   a set of processing elements (PEs 21) each having input and output;
   a boolean combiner (23), having inputs and outputs, a first portion of said inputs being connected to the outputs of said set of processing elements within its PEG and a second portion of said inputs being connected to at least one other PEG, having as outputs a set of boolean combined image transfer switches, a subset of which is feedback connected to said PEs within its PEG and a subset of which is forward connected to a receiving device outside its PEG, said first set of boolean combined image transfer switches being feedback connected (22, 29) to said set of PEs for full flexibility of PE interconnection internal to its PEG (10);
   said second set being connected via said bus to a receiving device, which is the subsequent PEG or, alternatively, is said CAGE exit means, for full flexibility of PE interconnection to the receiving device; and (c) control means coupled to said image means and said image processing subassembly CAGE means for enabling a variety of interconnections of processing elements to be achievable.

3. A configurable parallel processing element pipelined system, for image processing with computational efficiency within available capacity comprising:
(a) image means for providing image data;
(b) CAGE means, comprising at least one signal repeating image processing subassembly (CAGE 3) operatively connected to said image means for receiving image data, each CAGE comprising repowering repeating means (RR 20), a plurality of configurable processing element groups (PEGs 10) for processing said image data without storing a full iconic image within any of said processing element groups, a bus (9), and CAGE exit means (11-12, 17-18);
each PEG (10) comprising
a set of (N) processing elements (PEs 21) each having input and output;
a boolean combiner (23), having inputs and outputs, a first portion of said inputs being connected to the outputs of said set of processing elements in its PEG and a second portion of said inputs being connected to at least one other PEG, having as outputs two sets of (N) boolean combined image transfer switches each,
a first set of boolean combined image transfer switches connected to the outputs of said (N) PEs in its PEG for limited image transfer to said bus (9);
a second set (25) of (P) image transfer switches, connected to the second portion of said inputs of said boolean combiner 23, for limited image transfer from said bus (9); and
(c) control means coupled to said image means and said CAGE means for enabling a variety of interconnections of processing elements to be achievable to expand the capability of a PEG to include PEs from one or more other PEGs accessed via said bus.

4. A configurable parallel processing element pipelined system according to claim 3 further comprising:
(d) setup means directed by said control means to setup said image transfer switches and said CAGE means;
whereby the image processing system is configurable in accordance with the setup of PEs and image transfer switches within said PEGs.

5. A configurable parallel processing element pipelined system according to claim 3 further comprising:
said CAGE means comprises a plurality of signal repeating subassemblies (CAGEs 3,4,5 . . . 6), and
said CAGE exit means includes enumerator means, for specifying a function of an image in compressed form.

6. A configurable parallel processing element pipelined system, for image processing with computational efficiency within available capacity comprising:
(a) control means (0-1), including image means for providing image data;
(b) image transfer means (7-8, 13, 17);
(c) image processing subassembly CAGE means, comprising at least one signal repeating image processing subassembly (CAGEs 3, 4, 5 . . . 6), operatively connected to said image transfer means, each CAGE comprising repowering repeating means (RR 20), a plurality of configurable processing element groups (PEGs 10) for processing said image data without storing a full iconic image within any of said processing element groups, a bus (9), and CAGE exit means (11-12, 17-18);
each PEG (10) comprising
a set of (N) processing elements (PEs 21) each having input and output;
a boolean combiner (23), having inputs and outputs, a first portion of said inputs being connected to the outputs of said set of processing elements within its PEG and a second portion of said inputs being connected to at least one other PEG, having as outputs two sets of (N) boolean combined image transfer switches each,
a first set of boolean combined image transfer switches being feedback (22, 29) connected to said set of PEs in its PEG for full flexibility of PE interconnection internal to said PEG (10);
a second set of boolean combined image transfer switches being connected to a receiving device, which is the subsequent PEG or, alternatively, is CAGE exit means, for full flexibility of PE interconnection to the receiving device;
a first set (24) of image transfer switches, connected to the outputs of said (N) PEs for limited image transfer to said bus (9);
a second set (25) of (P) image transfer switches, connected to the second portion of said inputs of said boolean combiner 23, for limited image transfer from said bus (9);
said control means being coupled to said image transfer means and said image processing subassembly CAGE means for enabling a variety of interconnections of processing elements to be achievable to expand the capability of a PEG to include PEs from one or more other PEGs accessed via said bus; and
(d) set up means directed by said control means to setup said image transfer switches and said CAGE means;
whereby the image processing system is configurable in accordance with the setup of PEs and image transfer switches within said PEGs.

7. A configurable parallel pipelined image processing system according to claim 6 further comprising:
said boolean combiner (23) operates by table lookup.

8. A configurable parallel pipelined image processing system according to claim 6 further comprising:
said processing elements (21) operate by table lookup.

9. A configurable parallel pipelined image processing system according to claim 6 further comprising:
at least one of the processing elements in said set of (N) processing elements in one of said PEGs (10) neighborhood function logic means is equipped with a neighborhood function feedback mechanism connecting a function of its output back as partial input for the next image.

10. A configurable parallel processing element pipelined system, for image processing with computational efficiency within available capacity comprising:
(a) control means, comprising host computer means (0) with associated image acquisition means, and controller means (1);
(b) image transfer means, comprising video buffer (7) connected to said control means in such fashion as to receive both image input (13) and control input (14);

(c) CAGE means, comprising a plurality of signal repeating image processing subassemblies (CAGEs 3, 4, 5 ... 6), operatively connected to said image transfer means, each CAGE comprising repowering repeating means (RR 20) a plurality of configurable processing element groups (PEGs) (10) for processing said image input without storing a full iconic image within any of said processing element groups, a bus (9), and CAGE exit means (11–12, 17–18);

each PEG (10) comprising:

a set of (N) processing elements (21) each having input and output;

a boolean combiner (23), having inputs and outputs, a first portion of said inputs being connected to the outputs of said set of processing elements in its PEG and a second portion of said inputs being connected to at least one other PEG, having as outputs two sets of (N) boolean combined image transfer switches each;

a first set of boolean combined transfer switches having feedback (29) connection to said set of PEs for full flexibility of PE interconnection internal to its PEG (10);

a second set of boolean combined transfer switches being connected to a receiving device, which is the subsequent PEG or, alternatively, is CAGE exit means for full flexibility of PE interconnection to the receiving device;

a first set (24) of image transfer switches, connected to the outputs of said (N) PEs for limited image transfer to said bus (9);

a second set (25) of (P) image transfer switches, connected to the second portion of said inputs of said boolean combiner 23, for limited image transfer from said bus (9);

whereby a variety of interconnections of processing elements is achievable to expand the capability of a PEG 10 to include PEs from one or more other PEGs 10 accessed via said bus; and (d) setup means directed by said control means to setup said image transfer means and said CAGE means;

whereby the image processing system is configurable in accordance with the setup of PEs and image transfer switches within said PEGs (10).

11. A configurable parallel pipelined image processing system according to claim 10 further comprising:

said PEGs (10) are arranged in pipelined configuration within CAGEs (3–6), and said CAGEs (3–6) are arranged with pipelined connections from the first CAGE (C0) to the last CAGE Cn (6) in sequence, and finally to said image transfer means; and (e) said image transfer means comprises a video buffer (7) and video bus means (8) connecting said video buffer (7) and said CAGEs.

12. A configurable parallel pipelined image processing system according to claim 10 further comprising:

each PEG (10) comprises gating logic means (22) in said feedback connection, and said gating logic means is connected to said control means for setup.

13. A configurable parallel pipelined image processing system according to claim 10 further comprising:

said CAGE exit means includes a direct image transfer connection to the subsequent CAGE, distribution means for additional direct image transfer, and enumeration means for specifying an image in compressed form meaningful to said control means.

* * * * *